April 19, 1960
J. T. BALL
2,932,977
TRANSMISSION CONTROLS
Filed Dec. 27, 1954
8 Sheets-Sheet 1
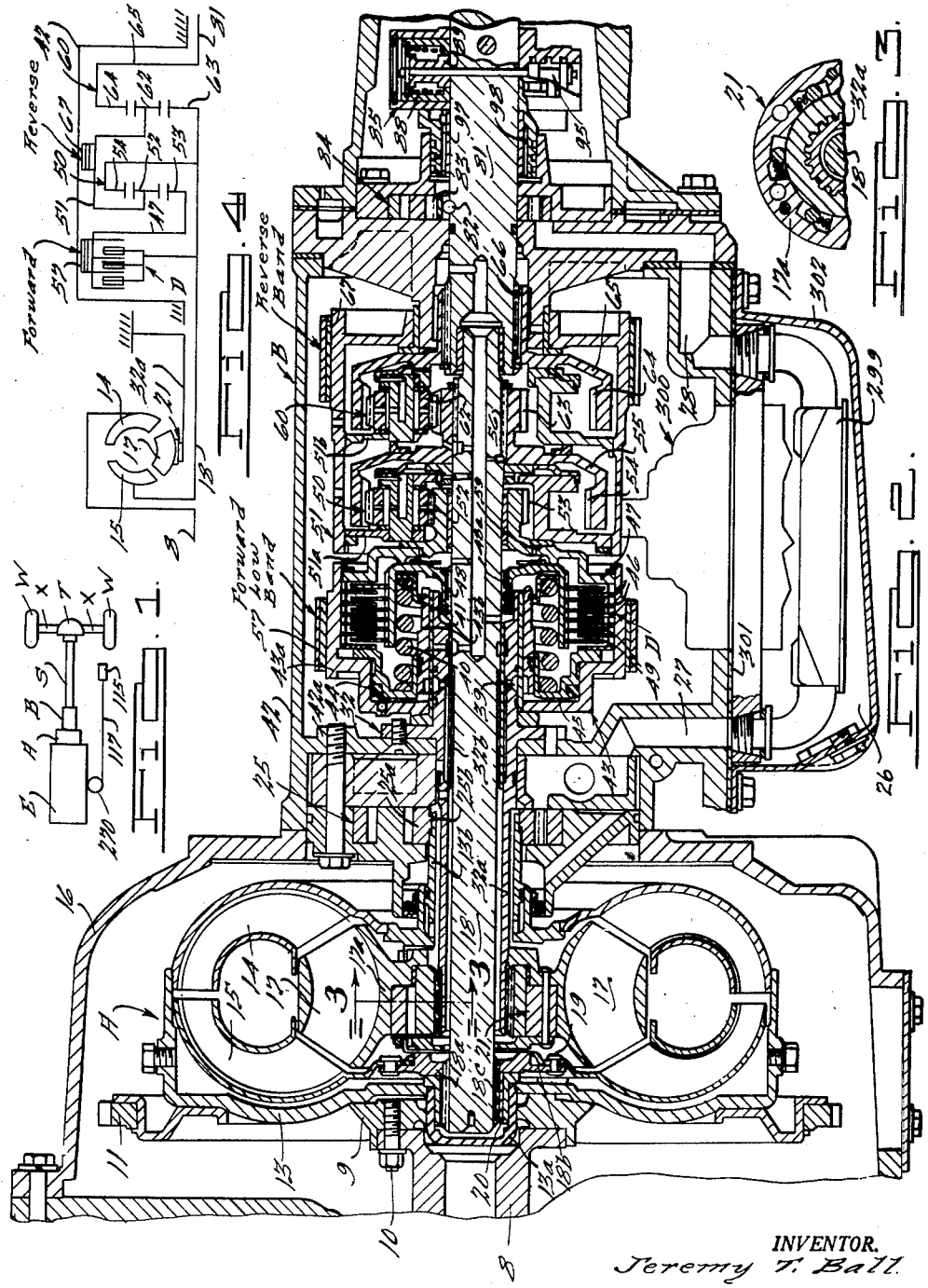
INVENTOR.
Jeremy T. Ball.
BY
Harness and Harris
ATTORNEYS.

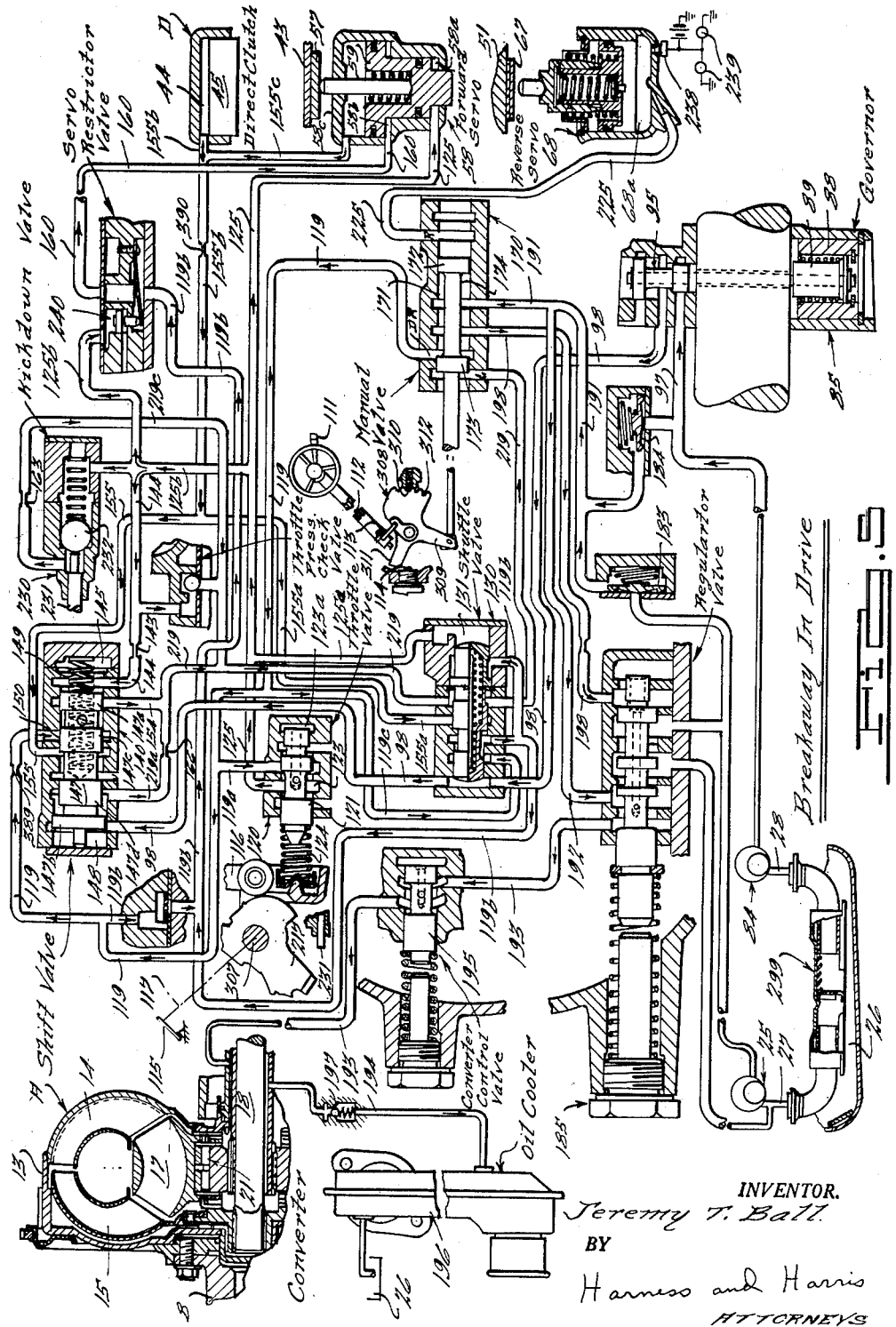

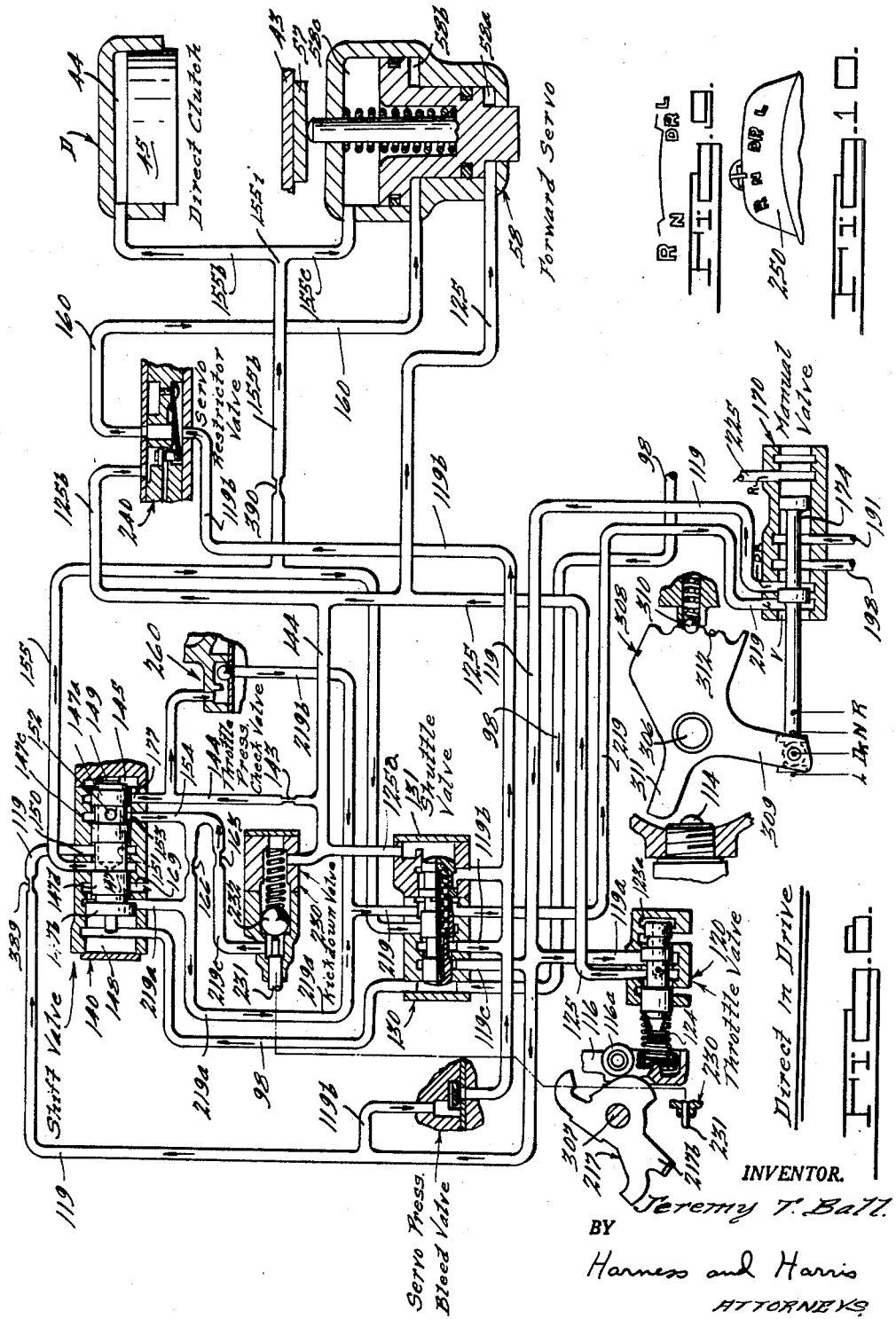

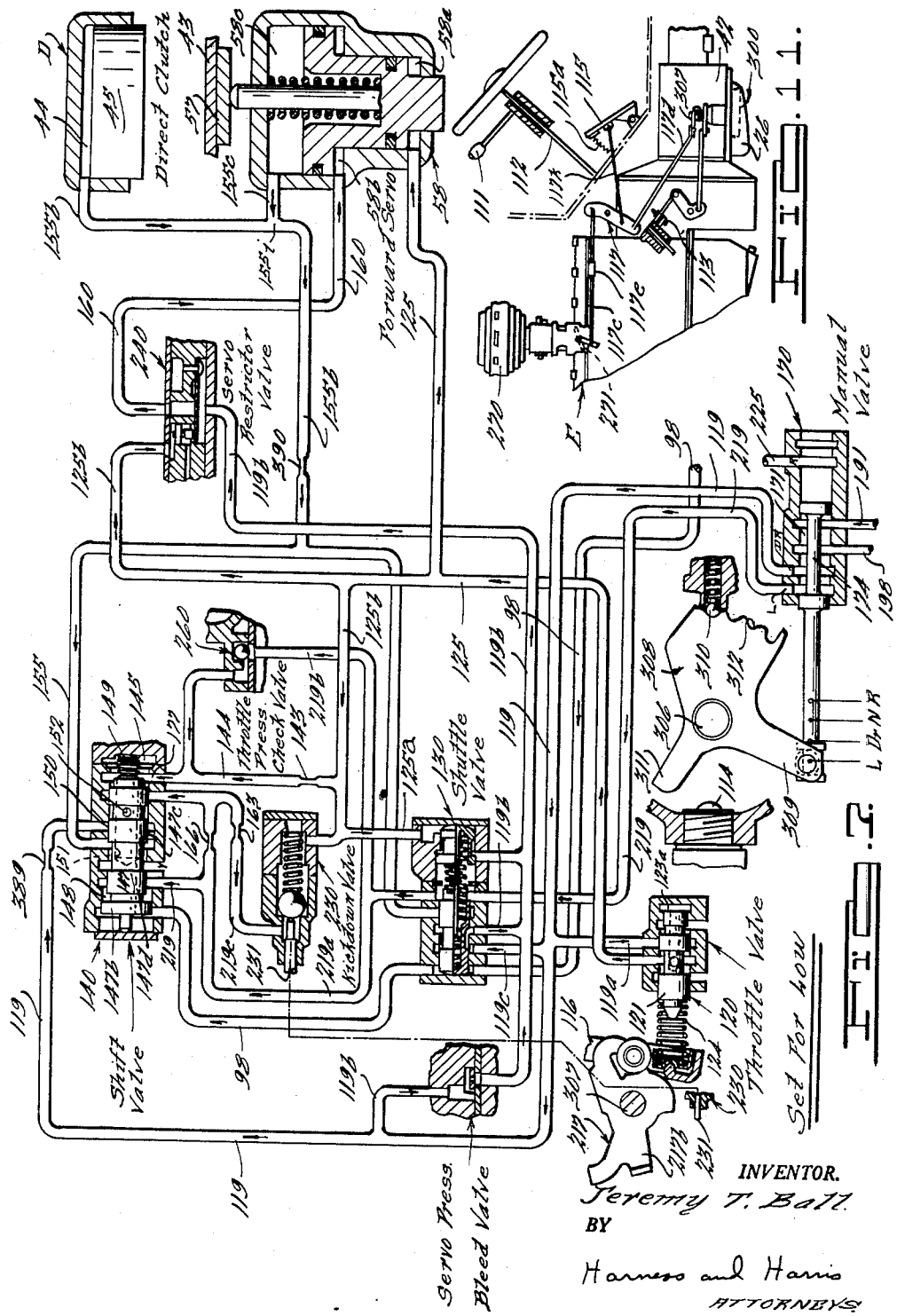

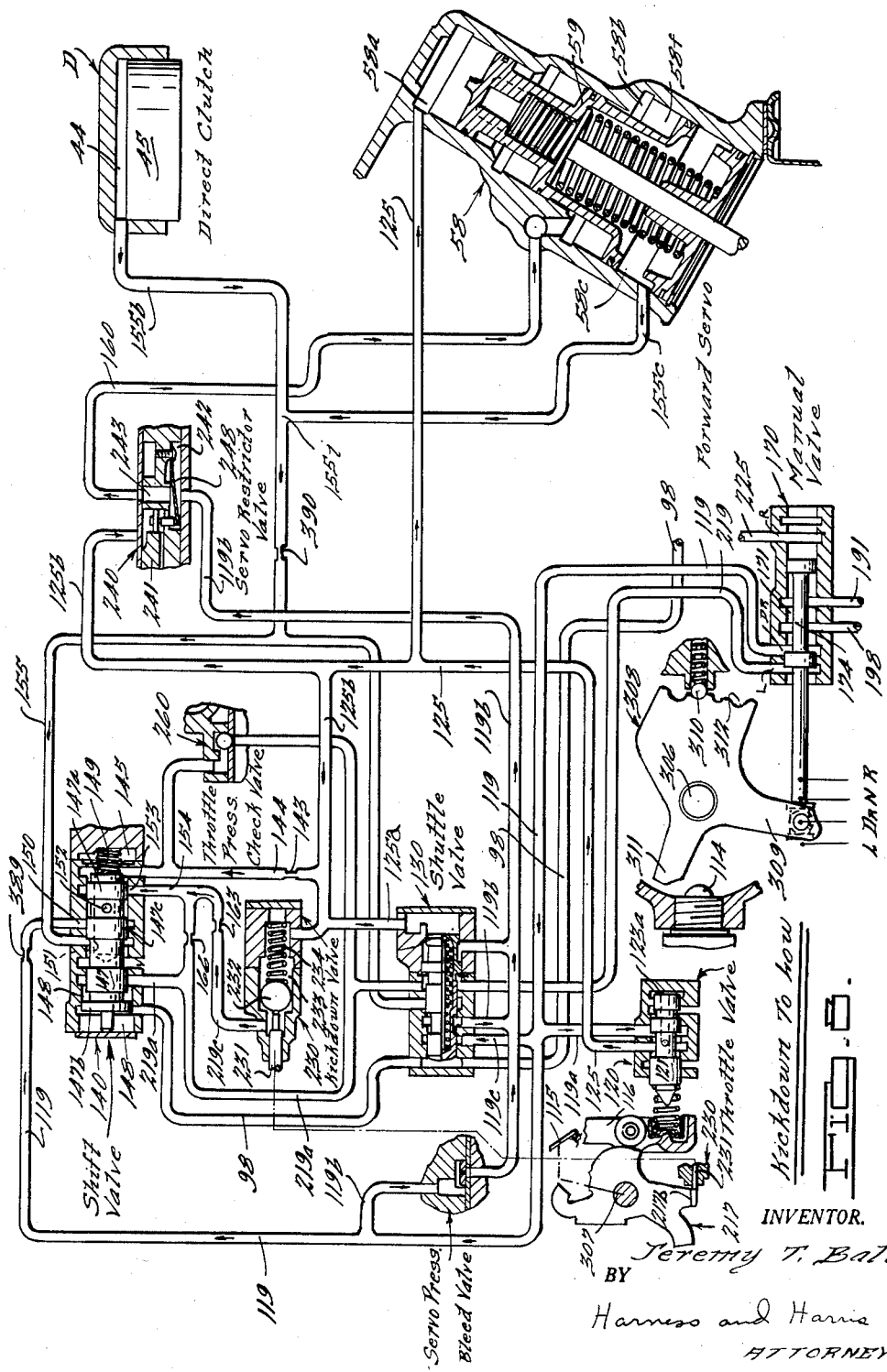

April 19, 1960 J. T. BALL 2,932,977
TRANSMISSION CONTROLS
Filed Dec. 27, 1954 8 Sheets-Sheet 6
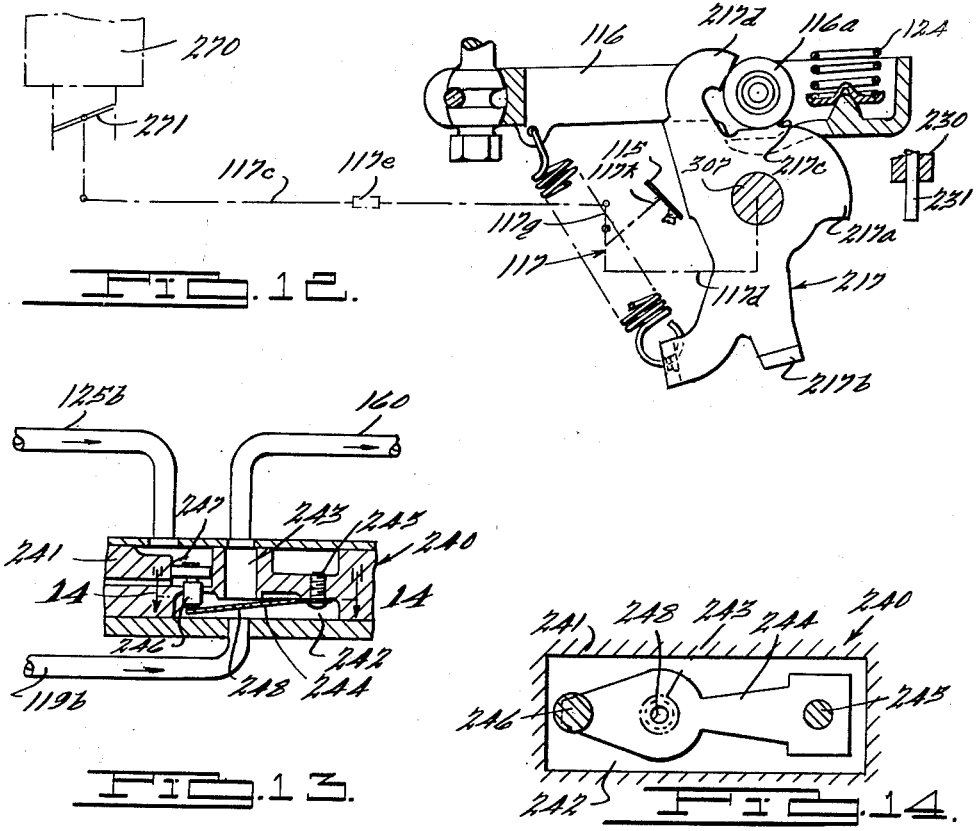
FIG. 12.
FIG. 13. FIG. 14.
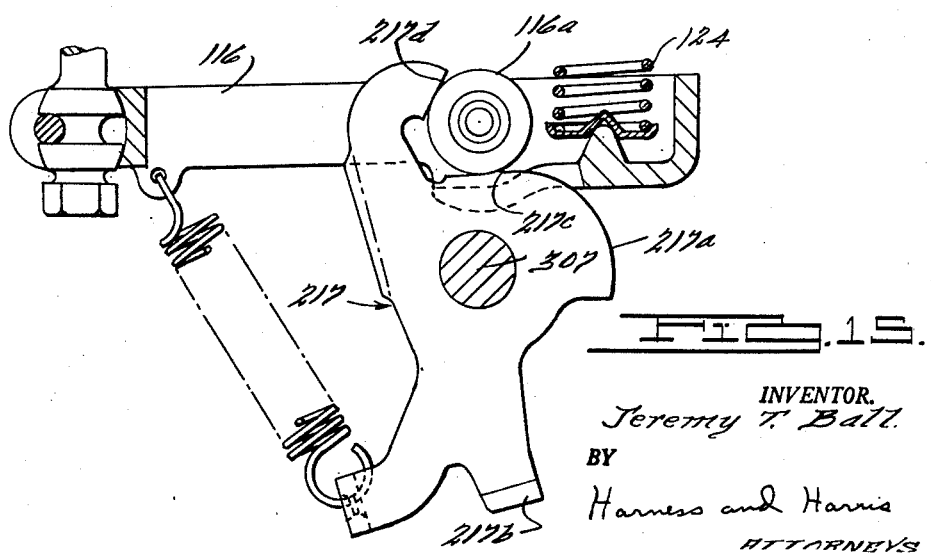
FIG. 15.
INVENTOR.
Jeremy T. Ball
BY
Harness and Harris
ATTORNEYS

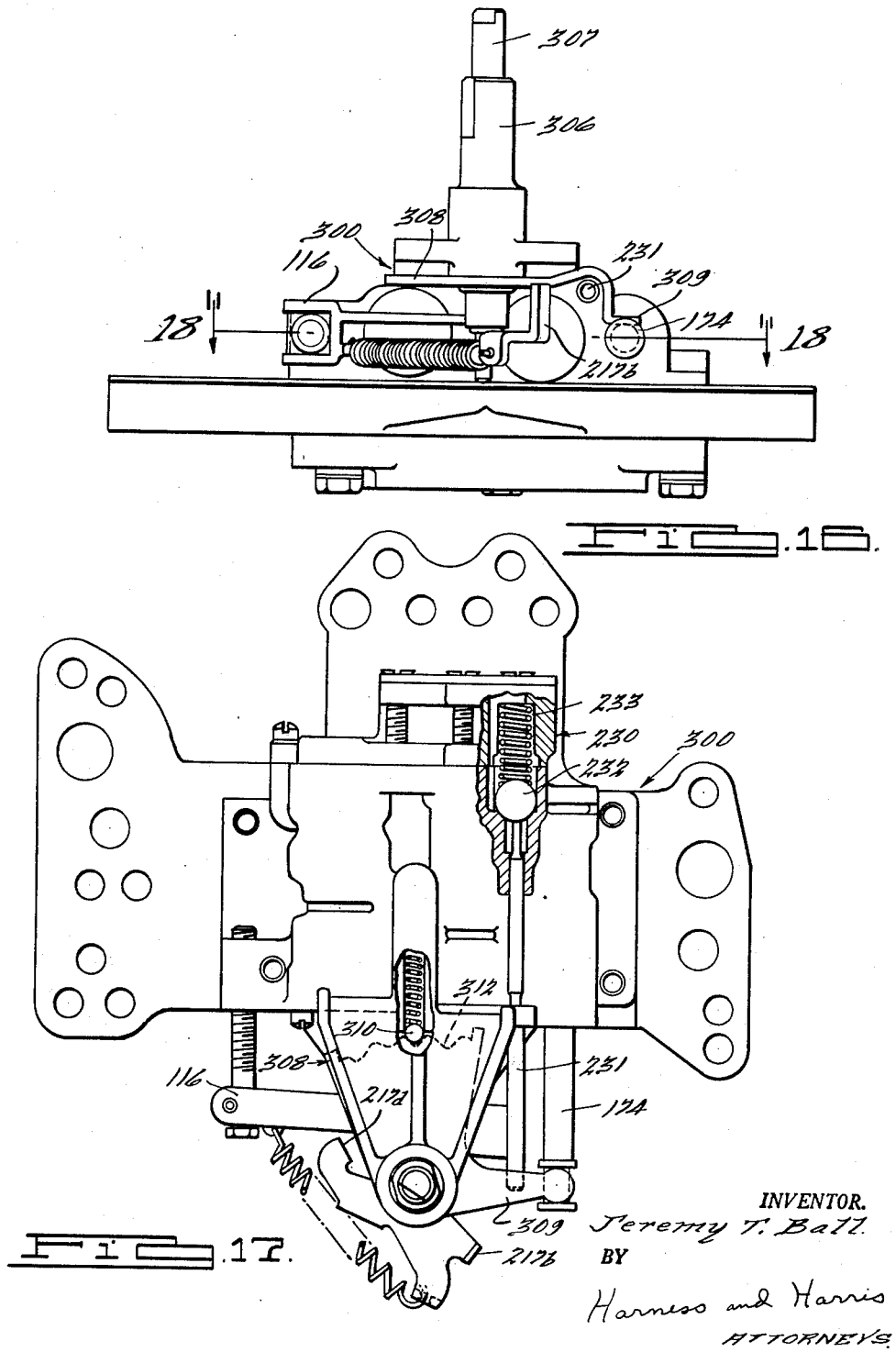

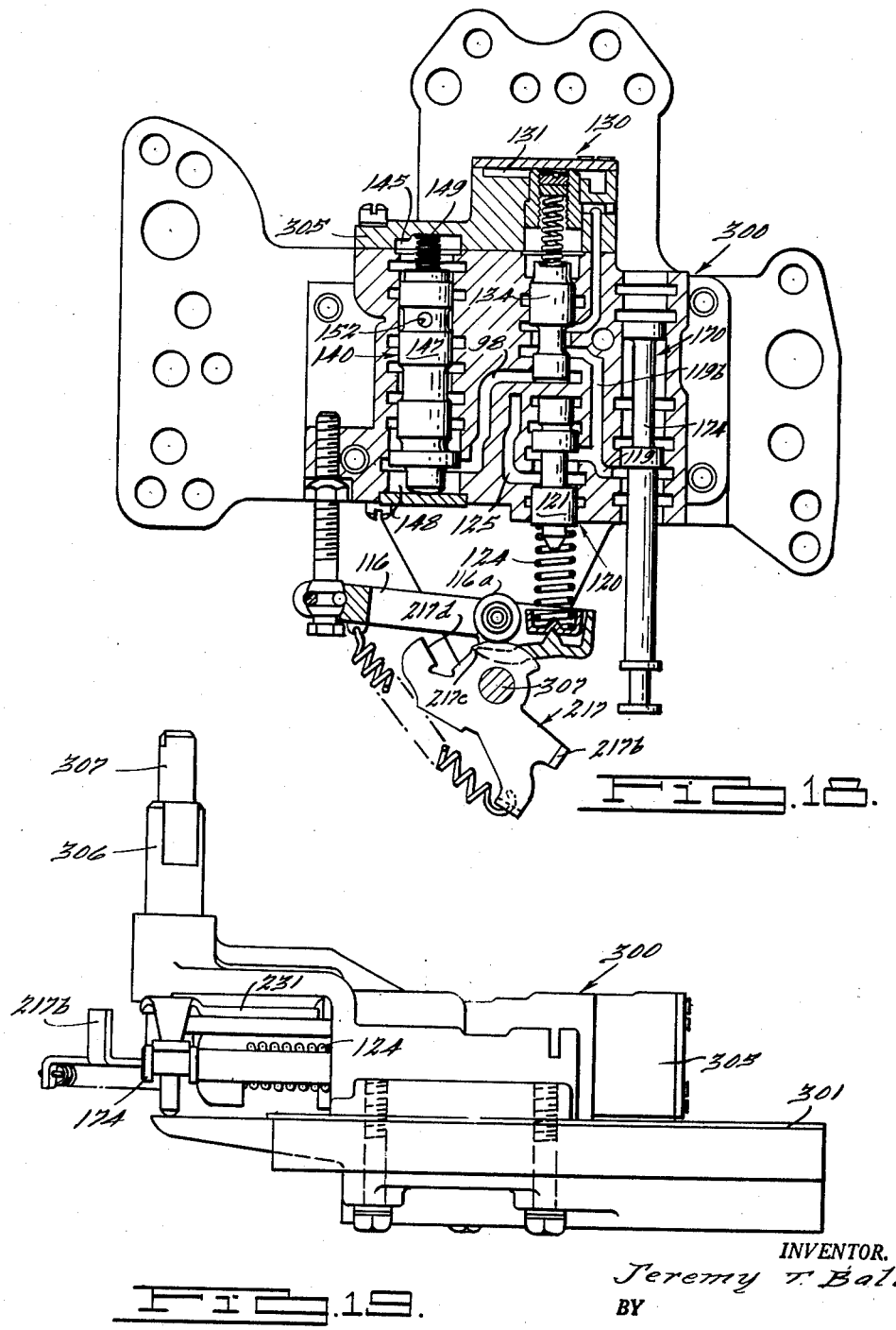

United States Patent Office 2,932,977
Patented Apr. 19, 1960

2,932,977

TRANSMISSION CONTROLS

Jeremy T. Ball, Birmingham, Mich., assignor to Chrysler Corporation, Highland Park, Mich., a corporation of Delaware Application December 27, 1954, Serial No. 477,870

3 Claims. (Cl. 74—472)

This invention relates to power transmission units primarily adapted for motor vehicle drive and particularly to the hydraulically operated control system that automatically operates the speed ratio change mechanism associated with a power transmission unit of this general type.

It is a primary object of this invention to provide control valving such that smooth, fast, upshifts and downshifts in speed ratio drive are assured under all driving conditions.

It is another object of this invention to provide control valving of an improved and simplified form that is economical to manufacture and particularly designed such that it facilitates installation in and control of the control system in which it is installed.

It is a further object of this invention to provide an improved throttle pressure control device for a hydraulically operable transmission control system.

It is still another object of this invention to provide a throttle pressure control cam that will insure the proper "throttle" pressure at coast drive or idle throttle positions and provide a sudden increase in "throttle" pressure on initial depression of the engine accelerator control.

It is still another object of this invention to provide an improved type of "throttle" pressure control in combination with a novel type of servo restrictor valve to improve the manner of operation of a pressure fluid operated servo mechanism.

Other objects and advantages of this invention will become readily apparent from a consideration of the subsequent description and the related drawings wherein:

Fig. 1 is a schematic view of a motor vehicle drive train that includes a power transmission unit embodying this invention;

Fig. 2 is a sectional elevational view of the power transmission unit utilized in the disclosed drive train of Fig. 1;

Fig. 3 is an enlarged, fragmentary sectional, elevational view of the one-way brake mechanism associated with the guide wheel of the drive train torque converter device, the view being taken on the line 3—3 of Fig. 2;

Fig. 4 is a schematic line diagram of the power transmission unit shown in Fig. 2;

Fig. 5 is a diagrammatic sketch partly in section of the hydraulically operated control system for this transmission when the valving thereof has been set for the initiation of forward drive through the Drive ratio and the valving is positioned in its downshifted or breakaway condition;

Fig. 6 is a fragmentary diagrammatic sketch partly in section of portions of the control valving shown in Fig. 5 when the control valving has been automatically upshifted to a position for producing the forward direct drive ratio;

Fig. 7 is a fragmentary diagrammatic view of portions of the control valving shown in Fig. 5 when the drive ratio selector lever has been placed in the Low forward drive position to lock the transmission in the forward underdrive ratio corresponding to the breakaway position, the throttle valve being closed at this time and the vehicle speed being in the lower speed range;

Fig. 8 is a fragmentary diagrammatic view, partly in section, of portions of the control valving shown in Fig. 5 after the engine accelerator pedal has been sufficiently depressed to cause a kickdown from the upshifted direct drive condition of Fig. 6 to the forward underdrive ratio or breakaway condition of Fig. 5;

Fig. 9 is a diagrammatic view in side elevation of the shift positions of the drive ratio selector lever;

Fig. 10 is a plan view of the drive ratio selector lever shift quadrant;

Fig. 11 is a side elevational view of a motor vehicle power plant employing this power transmission unit and the control mechanisms herein disclosed;

Fig. 12 is a diagrammatic sketch of the engine throttle valve control linkage and its connections to the throttle pressure control cam;

Fig. 13 is an enlarged, fragmentary, sectional elevational view of the servo restrictor valve utilized in this control system;

Fig. 14 is a sectional elevational view of the servo restrictor valve taken along the line 14—14 of Fig. 13;

Fig. 15 is an enlarged sectional elevational view of the throttle pressure control cam that forms a part of this invention;

Fig. 16 is an end elevation of the valve body that contains the several transmission control valves;

Fig. 17 is a top plan view, partly in section of the control valve body shown in Fig. 16;

Fig. 18 is a sectional elevational view of the valve body shown in Figs. 16 and 17, the view being taken along the line 18—18 of Fig. 16; and Fig. 19 is a side elevational view of the valve body shown in Figs. 16-18, the view being taken in the direction of the arrow 19 of Fig. 16.

Fig. 1 of the drawings diagrammatically discloses a motor vehicle power plant and drive train comprising an internal combustion engine E drivingly connected to a power transmission unit that consists of the hydrokinetic type of torque converter device A drivingly connected to a change speed gear box B. The output from gear box B drives a propeller shaft or drive shaft S that transmits drive through a differential unit T and axles X to the rear wheels W of the vehicle.

Fig. 2 of the drawings discloses the power transmission unit structure that comprises an hydrokinetic torque converter device A and a change speed gear box B that are arranged in a series connected drive transmitting relationship. The reference numeral 8 represents an end portion of a driving member, such as the crankshaft of the engine E of the motor vehicle power plant. The shaft 8 is drivingly connected to the drive transmitting ring 9 by the bolt means 10. The drive transmitting ring 9 is connected to the torque converter casing 13 which casing has an engine starter ring gear 11 fixedly mounted thereon and extending about the periphery of the casing 13. Within the converter casing 13 are mounted several vaned converter wheel elements, namely, the impeller or pump member 14, the turbine or runner member 15, and the guide or reaction member 17. A pair of guide wheels may be used in place of the single guide wheel 17 if so desired.

The vaned impeller wheel 14 is formed as an integral part of the converter casing 13 and is accordingly adapted to be rotatably driven by the driving shaft 8. Air circulating vanes (not shown) may be mounted on the exterior of the converter casing 13 to assist in cooling the converter contained fluid. Suitable air inlet and outlet ports (not shown) are provided in the housing 16 to permit passage of cooling air about the converter casing 13 during rotation thereof. The vaned turbine wheel 15 is drivingly connected by rivet means 19 to a radially extending flange portion 18b formed on a shaft hub member 18a. Shaft hub member 18a is drivingly connected by splines 18c to the forward end portion of the intermediate driven shaft member 18.

The intermediate shaft member 18 is adapted to transmit drive from the turbine member 15 of the torque converter device A to the planetary gearing of the gear box unit B that is arranged rearwardly of and in series with the torque converter device A. The forward end of intermediate shaft 18 is journalled in a bearing 20 that is piloted in an axially extending seat 13a formed in the hub of the torque converter casing 13. The intermediate portion of intermediate shaft 18 is rotatably supported by a sleeve plate 32 carried by the housing 42 of the gear box B.

The vaned guide wheel 17 is rotatably mounted within the converter casing 13 by means of the guide wheel hub portion 17a. Guide wheel hub portion 17a is supported by means of the one-way brake device 21, on the axially extending sleeve portion 32a of the sleeve plate 32. Sleeve plate 32 is fixed to and projects from the forward wall 42a of the relatively stationary gear box housing 42. The one-way brake 21 (see Fig. 3) is arranged such that it will permit only forward rotary movement (clockwise when looking from the converter A towards the gear box B) to be transmitted to the guide wheel 17 by the forward rotation of the impeller 14. The brake 21 continuously prevents rotation of the guide wheel 17 in a reverse or counterclockwise direction. The specific one-way brake 21 herein disclosed is shown in section in Fig. 3.

The torque converter unit A includes a gear type oil pump 25 having a driving gear 25a that is directly connected by key means 25b to the rearwardly projecting end of an axially extending, sleeve-like, flange portion 13b of the rotatable converter casing 13. The pump 25 draws oil from a supply sump 26 through supply conduit 27 and circulates this oil through the converter A, the transmission unit lubricating system and the various subsequently described, hydraulically operated control mechanisms associated with this power transmission unit (see Fig. 5). A second pump 84, driven by the transmission output shaft 81, is also included in this transmission unit. The second pump 84, which draws oil from the sump 26 through the conduit 28, provides a second source of pressure fluid for operation of the various aforementioned hydraulically operated devices and insures a pressure fluid supply even at times when the engine driven pump 25 might not be operating. Pump 84 will thus provide pressurized fluid during pushed or towed starting as well as during engine driven operation of the vehicle.

The gear box B includes the direct drive clutch D and the pair of planetary gear trains 50 and 60 that are adapted to cooperate with the torque converter device A to provide means for the transmission of forward and reverse drives to the propeller shaft S, Fig. 1.

The sleeve plate 32, that is detachably mounted on the forward wall 42a of the gear box housing 42, includes a rearwardly directed, axially extending, sleeve-like flange 32b that rotatably supports the drum element 43 of the direct drive clutch D. Drum element 43 has an outer peripheral, axially extending, surface 43a that is adapted to be engaged by the brake band 57 to anchor the drum 43 against rotation. Drum 43 is shaped so as to provide an axially extending piston receiving bore 44. Within bore 44 is reciprocably mounted a piston 45. The drum peripheral portion 43a has drivingly connected thereto a plurality of radially extending, axially shiftable, clutch plates 46 and a backing plate 47. The drum 43 and its plates 46 and 47 normally constitute the driven side of the direct drive clutch D. The driving side of clutch D is composed of the spider element 48 that is splined at 48a to the intermediate shaft 18. Spider element 48 has a group of radially extending, axially shiftable, clutch plates 49 drivingly connected thereto and arranged so as to extend between the aforementioned clutch plates 46. An axially extending spring 40, that is concentrically arranged about the sleeve plate flange portion 32b, is positioned to extend between the piston 45 and an anchor ring 41 that is fixed to the portion 43b of the drum 43. Spring 40 continuously urges the piston 45 forwardly to a clutch disengaged position.

On admission of pressure fluid to piston bore 44 through inlet channel 39, the piston 45 will be forced rearwardly to clampingly engage the clutch plates 46, 49 between the piston 45 and backing plate 47. On release of the pressure fluid from bore 44, the piston 45 will be moved forwardly by spring 40 to its clutch disengaged position.

The forwardly positioned planetary gear train 50 that is adapted to be activated to provide means for transmitting a forward underdrive ratio through this power transmission unit gear box B includes the drum-like planet pinion carrier 51. Carrier 51 has a forward wall portion 51a that rotatably supports a plurality (only one shown) of planet pinion gears 52. A sun gear element 53 is rotatable about the intermediate shaft 18 and is arranged in meshing engagement with the planet pinions 52. Sun gear element 53 is carried by and drivingly connected at 59 to the backing plate member 47 of the direct drive clutch D. Accordingly, drive may be transmitted from shaft 18 through spider 48, clutch plates 46, 49 and backing plate 47 to sun gear 53 whenever clutch D is engaged. The planet pinions 52 of gear train 50 are also in meshing engagement with the annulus gear 54 that is carried by a spider element 55. Spider element 55 is drivingly connected to the intermediate shaft 18 by the splines 56. The brake band 57, that was previously mentioned in the description of the direct drive clutch D, is adapted to be applied to drum element 43a of clutch D to anchor the sun gear 53 of planetary 50 against rotation. Band 57 is applied to drum 43 by means of the servo mechanism 58 (see Fig. 5). Application of band 57 to drum 43 activates planetary gear train 50 for the transmission of a forward underdrive ratio from input shaft 18 to output shaft 81 by means subsequently described. The transmission of the forward underdrive ratio is through planetary gear trains 50 and 60 which function in a compounded relationship for the transmission of forward drive. The means utilized for the transmission of this forward underdrive ratio will become more apparent after reading the description of reverse drive planetary gear train 60.

Rearwardly positioned, reverse drive planetary gear train 60 includes the planet pinion carrier plate 51b that is connected to and supported by the drumlike planet pinion carrier element 51. Rotatably mounted on carrier plate 51b are a plurality (only one shown) of planet pinion gears 62. Planet pinion gears 62 are arranged in meshing engagement with the sun gear element 63. Sun gear 63 is drivingly connected to the intermediate shaft 18 through splines 56. In the construction disclosed, it will be noted that the sun gear 63 of the rear planetary gear train 60 is integral with the annulus gear 54 of the forwardly positioned forward drive planetary gear train 50. Meshing with and surrounding the planet pinion gears 62 is an annulus gear 64. Annulus gear 64 has its supporting spider element 65 drivingly connected by splines 66 to the gear box output shaft 81. A brake band 67, that encircles the rear end portion of the drum-like carrier member 51, is arranged to be engaged with carrier 51 to anchor the carrier 51 against rotation. Band 67 is applied to carrier 51 by means of the servo mechanism 68 (see Fig. 5). Application of band 67 to the planet pinion carrier 51, while direct drive clutch D is disengaged, will activate rear planetary gear train 60 for the transmission of a reverse drive from intermediate shaft 18 through sun and planet gears 63, 62 respectively to the annulus gear 64 which latter gear is drivingly connected to the output shaft. This specific gear box is not a part of the invention herein claimed but is covered by the application of Augustin J. Syrovy et al. Serial No. 238,646, filed July 26, 1951, now U.S. Patent 2,748,622, dated June 5, 1956.

With the power transmission unit herein disclosed it is possible to initiate forward drive through a high torque multiplication forward underdrive ratio that is automatically convertible into a fluid cushioned, forward direct drive at the most advantageous point depending on the driving conditions encountered. The final fluid cushioned direct drive ratio, being transmitted through the fluid of the torque converter A, is particularly suited for smooth downshifts to and upshifts from the torque multiplying underdrive ratio. This fluid drive transmitting arrangement reduces the possibility of engine stall at very low vehicle speeds while the transmission is set in the cruising direct drive ratio.

Whenever forward drive is to be initiated through the transmission, direct drive clutch D is initially disengaged and braking band 57 is applied to the clutch drum portion 43a to anchor the sun gear 53 of forward drive planetary gear train 50 against rotation. With sun gear 53 anchored against rotation the gear train 50 is activated and torque converter driven input shaft 18 causes the forward drive train annulus 54 to drive the pinion gears 52 and the pinion gear carrier 51 forwardly or clockwise. As a result of the pinion gear carrier 51 rotating clockwise the several planet pinions 62 of the reverse drive gear train 60 are carried forwardly and at the same time shaft 18 is driving the sun gear 63 of the reverse drive gear train 60 forwardly so that a compounded resultant forward drive is transmitted to the annulus gear 64 that is drivingly connected to the output shaft 81. Acceleration through the starting combination fluid and mechanically generated, torque multiplying, forward drive train continues until certain output shaft speed and torque conditions are achieved and then the transmission control system, subsequently described, automatically causes the brake band 57 to be disengaged from the drum flange 43a and the planetary direct drive clutch D to be engaged to then convert the torque multiplying forward underdrive into a direct drive. Release of band 57 and engagement of clutch D provides for the transmission of a substantially 1:1 ratio forward direct drive from input shaft 8 through converter A to the intermediate driven shaft 18 which latter shaft is directly connected to the output shaft 81 by the engaged direct drive clutch D. Engagement of clutch D on release of brake band 57 locks up two gears of the planetary gear train 50 so that gear train 50 transmits drive from shaft 18 to gear train 60 at a 1 to 1 ratio through the planet pinion gear carrier 51. As sun gear 63 of gear train 60 is also rotating at the speed of shaft 18 it is obvious that gear train 60 is also locked up for the transmission for forward drive at a 1 to 1 ratio. With the forward drive ratio hereinabove described, it is possible to get exceptional accelerating power due to the fact that the starting drive torque multiplication ratio of about 2.5 to 1 of the converter is combined with the torque multiplying ratio of approximately 1.7 of the forward driving compounded planetary gear trains 50, 60 and these ratios combine with an axle ratio of between 3.3 to 3.9 to 1 to give an overall starting ratio of between 13.4 and 15.8 to 1. It is thought to be quite obvious that such a transmission will give rocket-like acceleration when associated with some of the current high power motor vehicle engines.

Reverse drive may be obtained by applying brake band 67 to the carrier member 51 of the reverse planetary gear train 60, the clutch D and band 57 being disengaged at this time. Drive from input shaft 8 is then transmitted through the torque converter A to turbine driven intermediate shaft 18. Shaft 18 drives the sun gear 63 of the reverse drive planetary train 60 forwardly while pinion gear carrier 51 is being held by brake band 67. Accordingly, a combination fluid and mechanically transmitted torque multiplying reverse drive is transmitted to the annulus gear 64 of gear train 60. As annulus 64 is directly connected to the output shaft 81, a combination fluid and mechanically generated, torque multiplying reverse drive is transmittable from the input shaft 8 through the converter A and gear train 60 to the output shaft 81 when band 67 is applied to carrier 51 and clutch D and band 57 are released.

Drivingly connected to the output shaft 81 (see Fig. 2) by the pin 82 is a driving gear 83 of the rear oil pump 84. Oil pump 84 is arranged to draw fluid from the oil sump 26 through conduit 28 and to circulate the discharged pressurized fluid through the torque converter A and the hydraulically operated control and lubrication systems of the transmission unit. As aforementioned, pump 84 is operative whenever the output shaft 81 is rotating above a predetermined speed. Suitable valving, such as the line pressure regulator valve unit 185 shown in Fig. 5, is provided to insure that pump 84 automatically takes over the supply of pressure fluid for the transmission unit and its control system whenever the speed of output shaft 81 exceeds a certain predetermined relatively low value. This pressure regulator valving 185 is described in the co-pending application of William L. Sheppard, Serial No. 98,493, filed June 11, 1949, now U.S. Patent No. 2,697,363.

Also drivingly mounted on the output shaft 81 (see Figs. 2 and 5) is a speed responsive, centrifugal force operated, governor mechanism 85 which provides one of the means for aumatically controlling operation of this power transmission unit. It is obvious that various types of vehicle speed responsive controls may be used with this transmission but the specific governor mechanism 85 herein disclosed is particularly advantageous due to its simplified design and novel manner of operation. This governor unit is arranged such that it does not require shaft driven gearing or electrically operated control units but instead uses hydraulic pressure supplied by the rear pump 84 in combination with the centrifugal force effect of a pair of output shaft mounted telescopically arranged weights 88, 89 for controlling actuation of the radially movable governor control valve 95 so as to provide a novel type of pressure fluid operated, output shaft speed responsive governor mechanism. This governor mechanism 85 is completely described in the said co-pending application of William L. Sheppard, Serial No. 98,493, filed June 11, 1949, now U.S. Patent No. 2,697,363.

While the pressure of the fluid discharged from the pump 84 into the governor inlet passage 97 is almost constant and also greater than the pressure of the fluid discharged from the governor mechanism into the governor outlet passage 98, due to the reducing valve action of governor piston valve 95, still it will be found that the pressure of the fluid discharged from the governor 85, hereafter denoted "governor" pressure, is roughly proportional to the speed of the output shaft 81. Governor 85 thus provides an efficient, accurate, simplified form of speed sensitive control mechanism.

The control system (see Fig. 5) for this transmission includes the manually operable drive ratio selector lever 111 which is rotatably mounted on the conventional motor vehicle steering shaft 112. Control lever 111 is connected by suitable linkage 113 and the rotatably mounted plate 308 to the manually operable drive ratio selector valve 170. Plate 308 has one arm 309 connected to the valve 170, another arm 311 is arranged to control the engine starter switch 114 so that the engine can be started only when the transmission is in Neutral, and another serrated portion 312 of the plate 308 is engaged by a spring pressed detent 310 to anchor the plate 308 in its selected position. Valve 170 has four drive ratio positions which are represented in the drawings by the letters R, N, DR and L respectively. These letters correspond to the Reverse, Neutral, Drive and Low ratios which ratios are selectively obtainable by manual shift of selector lever 111. The letter V associated with the valves 120, 140, 170, 185 and with the other valve units of this control system, denotes a vent or drain port for returning the control system pressure fluid to the supply sump 26.

Pressure fluid from either of the supply pumps 25 or 84 is directed into the main supply conduit 191 which is connected to the inlet port of manually operable drive ratio selector valve 170. The pressure of the fluid in supply conduit 191 is controlled by the pressure regulator valve 185 and this controlled, substantially constant intensity, pump supplied pressure is denoted "line" pressure (usually 90 p.s.i.) for purposes of description hereafter. Check valves 183 and 184 maintain a closed pressure fluid supply system. On admission of "line" pressure fluid to the bore 171 of drive ratio selector valve 170 certain of the control mechanisms associated with the control system will be energized and one or the other of the several aforementioned drive ratios will be established. When the manual valve 170 is located in the Neutral position the valve lands 172 and 173 of its plunger or spool type valve element 174 close off the escape of pressurized "line" fluid from valve bore 171 and thus "line" pressure fluid cannot pass from supply conduit 191 through valve 170 to activate any of the drive ratio control mechanisms. However, it should be noted that when the manually controlled valve 170 is placed in the Neutral position with the vehicle engine running, or when the vehicle is being pushed or towed so that one or the other of pumps 25 or 84 is operating, "line" pressure fluid from one or the other of pumps 25, 84 can still be directed through conduit 192 to the line pressure regulator valve 185 and through valve 185 to the conduit 193 that supplies pressure fluid to the converter A. Conduit 193 may contain a converter fluid pressure regulator valve 195 to control the pressure of the fluid directed into the converter A. Pressure fluid passing through converter A is passed on to the pressurized transmission lubrication system and to the sump 26 by the discharge conduit 194. Conduit 194 has associated therewith a check valve 197 that pressurizes the converter and prevents cavitation, frothing in the converter and/or blowing of the converter fluid into the sump 26 under abnormal conditions. Conduit 94 may be connected to a finned air or fluid circulating radiator-type converter fluid cooling unit 196. The converter pressure regulator valve 195 and the check valve 197 cooperate to maintain a pressure of approximately 50 to 60 p.s.i. in the converter at all times when the engine is operating or the vehicle is in motion.

In either of the forward drive ratio positions DR (Figs. 5 and 6, or L (Fig. 7) of the drive ratio selector valve element 174, "line" pressure fluid from supply conduit 191 will always be directed through the bore 171 of valve unit 170 and into the conduits 119, 119a that connect the manual drive ratio selector valve unit 170 with the torque controlled or torque responsive throttle valve unit 120. Consequently a form of torque responsive control is always available to cooperate with the driven shaft speed responsive governor 85 to conjointly control automatic operation of this transmission unit in all forward drive ratios. "Line" pressure passed to conduit 119 whenever the ratio selector valve 170 is in either Drive or Low ratio also fills conduit 119b and is passed into conduit 160 for transfer to the "apply" side chamber 58b of the servo 58 for forward drive train 50. Thus planetary 50 is activated for the forward underdrive whenever valve unit 170 is set for Drive or Low and all starts will be through the underdrive initially.

The torque responsive throttle valve unit 120 (see Fig. 5) has operably associated therewith a kickdown valve-controlled mechanism 230 that is hereinafter described. The torque responsive throttle valve 120 is operated by linkage 116, 117 connected to the throttle control or accelerator pedal 115 for the engine unit E that drives this power transmission unit. Pedal 115 is connected by linkage 117 to the rotatable cam 217 that is adapted to activate the pivotally mounted lever linkage 116. The piston type throttle valve element 121 of valve unit 120 is arranged to be reciprocated by oscillation of the linkage 116. Throttle valve unit plunger element 121 is arranged to reciprocate in the bore 123 of the valve unit 120 and it is connected to the actuating linkage 116 through a compression spring 124. At closed or idle throttle position of the accelerator pedal 115 with the manual control valve 170 set for either of the forward drive ratios, DR or L, the arrangement of the plunger valve 121 in bore 123 of valve 120 is such as to permit pressurized fluid to seep from the supply conduit 119a into and through valve 120 to the conduit 125 and then into branch conduits 125a and 125b. The pressure of the fluid passing out of valve 120 will be lower than that of the "line" pressure supplied thereto due to the reducing valve action of valve 120. This reduced or compensated "line" pressure supplied to conduits 125, 125a and 125b is denoted "throttle" pressure hereafter.

The "throttle" pressure admitted to the branch conduit 125b from valve 120 is passed into branch conduit 144 and through a restriction orifice 143 in conduit 144 and then into the bore chamber 145 located at the right end of the valve bore in valve unit 140. Valve unit 140 reciprocably mounts the multiple land plunger valve 147. It is thought to be obvious that the "throttle" pressure admitted to bore chamber 145 will apply a throttle responsive force to the right end of valve 147 which force will tend to shift the valve 147 towards the left end of valve unit 140.

In addition to the force of the "throttle" pressure acting on the right end of valve 147, there is a spring generated force constantly applied to the right end of valve 147 that also tends to shift the valve 147 towards the left end of the valve unit 140. The spring generated force results from the mounting of the precompressed spring 149 in the right end of bore 146 so that it acts to urge valve 147 leftward at all times.

At the left end of the valve unit 140 is a chamber 148 that is connected by the conduit means 98 to the outlet from the hydraulic governor 85. Conduit 98 pressurizes the valve bore chamber 148 of valve unit 140 with a "governor" pressure fluid in which the fluid pressure intensity is proportional to the speed of the transmission output shaft 81. It is thus thought to be apparent that a rightwardly directed force will act upon the left end of valve 147 that is proportional to the speed of the vehicle and this "governer" pressure generated force will tend to shift the valve 147 towards the right end of valve unit 140.

Thus it will be seen that the pressure differential between the "throttle" responsive pressure fluid and the spring 149 applied to the right end of valve 147 and the "governor" pressure fluid applied tto the left end of valve 147 effects reciprocating movement of the valve 147 within valve unit 140. At relatively low output shaft speeds with an open throttle the force of the "throttle" pressure in chamber 145 plus the force of spring 149 is greater than the force of the "governor" pressure in chamber 148 and the valve 147 is automatically positioned substantially as shown in Fig. 5. As the output shaft speed increases a point is reached where the "governor" pressure in chamber 148 exerts a rightwardly directed force on the left of valve 147 that overcomes the leftwardly directed force of the "throttle" pressure and the spring 149 on the right end of valve 147 and then valve 147 shifts towards the right to a position such as that shown in Fig. 6. This differential pressure generated shift of the valve 147 is utilized to alternately connect and disconnect the "line" pressure conduits 119 and 155 (see Figs. 5 and 6) and thereby automatically control operation of the direct drive clutch D and the control servo 58 for the forward underdrive braking band 57 as will be clearly brought out hereafter. It should be pointed out at this time that the diameter of the left end of valve 147 is greater than the diameter of the right end of valve 147; thus, the intensity of the "governor" pressure in chamber 148 need not actually exceed the intensity of the "throttle" pressure in chamber 145 in order to effect a rightward shift of the valve 147. It is the differential forces produced by the opposed "throttle" and "governor" pressures in combination with the force of spring 149 that dictate the shifts of valve 147. Furthermore, it is thought to be obvious that the points of shift of valve 147 will vary considerably depending on the degree of throttle valve opening as well as the particular output shaft speed at any given time. A more detailed description of the shift valve unit 140 and its manner of operation is contained in the co-pending application of J. T. Ball et al., Serial No. 268,274, filed January 25, 1952, now Patent No. 2,849,889.

Automatic, and substantially simultaneous, operation of the direct drive clutch D and the servo 58 for the forward drive planetary brake band 57 is accomplished by the reciprocatory shift of valve 147. It will be noted that "line" pressure, which is a relatively high, constant intensity, pump supplied, pressure fluid (90 p.s.i. in forward drive ratios) is conducted to the inlet port 150 of shift control valve unit 140 by the conduit 119. "Line" pressure is supplied to conduit 119 by the pumps 25 and/or 84 whenever the drive ratio selector valve 170 is set for either of the forward drive ratios DR or L respectively. At relatively low output shaft speeds (see Fig. 5) with the valve 170 set for Drive, the "throttle" pressure in bore 145 at the left end of valve 147 will position the intermediate land 147c of valve element 147 across the "line" pressure inlet port 150 to prevent the transfer of "line" pressure fluid from conduit 119 through the bore of valve 140 and out into the conduit 155. Conduit 155 has branch conduits 155b and 155c that are connected respectively to the "apply" bore 44 of the direct drive clutch D and to the "release" chamber chamber 58c of the servo 58. Thus whenever the transmission ratio control valve 170 is set for Drive and shift valve 147 is in the position shown in Fig. 5 then "line" pressure is not admitted to the valve bore of valve 140 or to conduit 155 from th supply conduit 119 and drive will be through the torque converter A and the compounded forward underdrive gear trains 50, 60, due to direct drive clutch D being disengaged and brake band 57 being applied. Likewise, whenever the shift valve 147 is moved to the right to the position shown in Fig. 6, "line" pressure will be transferred from conduit 119 through valve port 50 to conduits 155, 155b and 155c and accordingly direct drive clutch D will be applied and brake band 57 released so that a forward drive is then transmitted through the torque converter A and the locked up gear trains 50, 60 whereby a direct drive of almost a 1 to 1 ratio is transmitted to the output shaft 81. Automatic upshifts and downshifts between the direct drive and the underdrive ratios are accomplished by the hydraulically actuated, automatic, snap action shifting of the valve 147 with changes in the differential pressures or forces applied to opposite ends of the valve 147 due to the opposed "throttle" and "governor" pressures and the spring force applied to the valve element 147. In addition, driver controlled downshifts or kickdowns from the direct drive to the starting underdrive ratio can be accomplished by driver depression of the accelerator pedal 115 to a predetermined open throttle position such that the kickdown valving 230, previously mentioned and subsequently described with regard to Fig. 8, is brought into operation to accomplish the kickdowns or downshifts.

Admission of "throttle" pressure fluid (see Fig. 5) to conduit 125, on opening of the engine throttle by accelerator depression, not only pressurizes conduit 125, branch conduit 125b, and conduit 144 so as to apply throttle pressure to the chamber 145 of direct clutch control valve 140, but in addition, it also pressurizes the branch conduit 125a that is connected to bore chamber 131 in the right end of the shuttle valve unit 130. Shuttle valve 130 (see Figs. 5 and 6) is a mechanism that insures smooth, quick, speed ratio changes and it is more completely described in William L. Sheppard pending application Serial No. 254,531, filed November 2, 1951, now U.S. Patent No. 2,740,304, dated April 3, 1956. The shuttle valve 130 forms no part of the invention claimed herein so further description thereof is considered unnecessary.

From a consideration of Figs. 5–8, it is thought to be apparent that on movement of the drive ratio control valve element 174 from the Neutral to either the Drive or Low forward drive positions, that "line" pressure fluid will flow from supply conduit 191 through the drive ratio control valve 170, then through the conduits 119 and 119c to the shuttle valve 130. At low vehicle speeds the "line" pressure in conduit 119c passes through the shuttle valve 130 and out into branch conduit 119b. "Line" pressure may pass from the branch conduit 119b through the servo restrictor valve 240 and then into conduit 160 so as to apply the "line" pressure to the "line" pressure chamber 58b on the "apply" side of the forward underdrive planetary servo 58. Application of "line" pressure to chamber 58b of servo 58 applies the brake band 57 to drum 43 so as to activate the gearing 50, 60, of planetary gear box B for the transmission of the starting forward underdrive.

At closed or idle throttle (see Fig. 5) the throttle actuated vale 120 is substantially closed to prevent the supply of any significant "throttle" pressure to the conduit 125 and the branch conduits 125b and 125c. Accordingly, at closed throttle there is no significant "throttle" pressure transmitted from conduit 125 to the "throttle" pressure chamber 58a that is also on the apply side of forward drive servo 58. Thus at closed throttle there is no significant "throttle" pressure in servo chamber 58a assisting the "line" pressure in chamber 58b to apply the forward underdrive brake band 57 to drum 43. However, as soon as the accelerator 115 is depressed to accelerate in forward drive, then "thottle" pressure of a progressively rising intensity is passed through valve 120 and conduit 125 to the chamber 58a on the "apply" side of servo 58 to assist the "line" pressure in chamber 58b in anchoring the brake band 57 to the drum 43. With the disclosed arrangement it is apparent that as the load that is applied to the output shaft 81 is increased, the accelerator 115 must be further depressed to increase the torque to overcome the load. Depressing the accelerator opens throttle valve 120 and increases the intensity of the "throttle" pressure transmitted to line 125 and to servo chamber 58a so that brake band 57 will be anchored by means that hold in proportion to the load applied. This results from the fact that the variable "throttle" pressure band applying force in servo chamber 58a supplements and assists the constant intensity "line" pressure band applying force in chamber 58b.

From a consideration of Figs. 5-8 it will be noted that the right end of the plunger type shift valve element 147 of valve 140 is pierced by an axially extending counterbore 151. This counterbore 151 is crossed by a transversely extending crossbore 152 in the neck region between the two valve lands 147a and 147c at the right end of valve 147. The counterbore 151 thus not only provides a seat for the valve springs 149 at the right end of the valve 147 but in addition it cooperates with the crossbore 152 to provide a conduit means for transferring or transmitting pressurized fluid between the valve bore chamber 145 at the right end of the valve unit and the portion of valve bore located between valve lands 147a and 147c. This conduit means composed of the valve bores 151 and 152 is an essential part of the shift valve unit structure that provides for snap action shift of the shift valve element 147 as explained in detail in the aforementioned pending J. T. Ball et al. patent application, Serial No. 268,274, filed January 25, 1952.

Connected to the valve bore of valve unit 140 between the right end bore chamber 145 and the "line" pressure inlet conduit 119 is a vent conduit 154. Conduit 154 is connected through conduit 219c and restriction orifice 163 to the kickdown valve unit 230. Kickdown valve unit 230 includes a spring supported, ball-type, valve element 232. The operation of the ball-type kickdown valve element 232 will be completely described subsequently when Fig. 8 is referred to in detail.

Shift valve vent conduit 154 is connected by a restriction orifice 166 to the "line" pressure supply line 219a. "Line" pressure supply conduit 219a is connected by conduit 219 to the Low port of the drive ratio selector valve 170. Accordingly, whenever the drive ratio selector valve 170 is set for the Low ratio drive, conduits 219, 219a and 219b are supplied with "line" pressure of approximately 90 p.s.i. At all other times the conduits 219, 219a and 219b are disconnected from the several pressure fluid supply sources and merely provide a drain conduit means that empties into the pressure fluid supply sump 26 through the vent port V at the left end of valve unit 170. Conduit 219a is connected to the inner end of the chamber 148 at the left end of valve unit 140. With the arrangement shown it is possible to pressurize the inner end portion of the chamber 148 of valve unit 140 with "line" pressure whenever the valve 170 is set for the Low ratio drive. Accordingly, the "governor" pressure that is normally directed into the outer end of the valve chamber 148 at the left end of valve unit 140 will be unable to upshift the valve 147 towards the right and the transmission control system will be locked in the Low drive ratio. This is more clearly explained when Fig. 8 is specifically described.

From the above description of the differential pressure, bleed-type, unit shift valve 140 it will be found that the "throttle" pressure supplied to valve unit 140 through connected conduits 125, 125b, 144 is controlled by three restriction orifices 143, 163 and 166 respectively and by the movement of the reciprocable, plunger-type, valve element 147 that is positioned between the orifices 143 and 166. When the drive ratio selector valve 170 is in Neutral with the engine operating, the lands 172, 173 of drive ratio control valve 174 will be located such that "line" pressure cannot be supplied to conduits 119, 119a, 119b and 119c. Accordingly, forward drive low servo 58 cannot apply band 57 to activate the gear trains 50, 60 for the transmission of a forward drive. Likewise, "line" pressure cannot be passed through valve 170 to the conduit 225 to cause servo 68 to apply band 67 so as to activate gear train 60 to provide for the transmission of a reverse drive.

If the drive ratio selector valve 170 is set for Drive as shown in Figs. 5, 6 and 8 then "line" pressure is supplied to conduits 119, 119a, 119b and 119c, as well as to conduit 160, and then servo 58 will apply band 57 and condition the gearing 50, 60 for a starting forward underdrive ratio. Prior to movement of the vehicle in the Drive ratio, the shift control valve 147 will still be positioned as shown in Fig. 5 and "throttle" pressure, which may vary from 15 p.s.i. to 90 p.s.i. is passed through conduits 125, 125b, through conduit 144 and restriction orifice 143 into bore chamber 145 at the right end of valve unit 140. "Throttle" pressure admitted to the bore chamber 145 at the right end of valve 140 also passes into the bores 151, 152 of the valve element 147. Prior to movement of the vehicle "governor" pressure is not directed into valve bore 148 at the left end of valve unit 140 so that valve 147 remains in the downshifted position shown in Fig. 5 due to the action of the forces of the spring 149 and the "throttle" pressure applied to the right end of valve element 147. In the Fig. 5 downshifted position of valve 147, the "throttle" pressure in valve bore chamber 145 cannot pass through the valve and out into vent conduit 154 for the valve land 147a covers the outlet port to conduit 154. However, as the vehicle begins to move forward in the forward downshifted or underdrive ratio with opening of the throttle valve 120 by accelerator depression, an increased "throttle" pressure is supplied to valve bore chamber 145 at the right end of valve 140 and an increasing "governor" pressure is supplied to valve bore chamber 148 at the left end of shift valve 140. As the vehicle speed increases the "governor" pressure supplied to the chamber 148 at the left end of valve 140 produces a force on the left end of valve 147 that overcomes the combined forces of the spring 149 and the "throttle" pressure applied to the right end of valve 147 and then the valve 147 begins to shift towards the right. After a predetermined rightward movement of the valve 147, due to the predominant force of the "governor" pressure in chamber 148, the valve land 147a will uncover the vent port to conduit 154 and permit the "throttle" pressure in bore chamber 145 to pass out through the valve bore into the vent conduit 154. The pressurized fluid passed into conduit 154 is passed through the restriction orifice 166 and then out into the drain conduits 219a, 219 that drain through the open vent V at the left end of valve 170 if valve 170 is set for Drive. It will be seen then that the "throttle" pressure applied to the right end of the valve 147 during accelerator depression, is drained to sump 26 through the pair of series arranged, substantially identical, restriction orifices 143, 166 after a predetermined rightward shift of the valve 147 by the force of the "governor" pressure applied to valve bore chamber 148 at the left end of valve 147. On uncovering of the vent conduit 154 by rightward shift of valve 147, the pressure of the fluid throttle pressure fluid in valve bore chamber 145 is reduced to approximately one-half (½) its former value due to the escape of this pressurized fluid through the series arranged orifices 143, 166 so immediately the "governor" pressure force applied to the right end of valve 147 overcomes the reduced resultant force of the "throttle" pressure applied to the left end of valve 147 and the valve 147 is snapped towards the left to the upshifted position shown in Fig. 6. This is explained in considerable detail in the aforementioned J. T. Ball et al. application Serial No. 268,274.

Based upon the description of the upshift action of the valve 147, it is thought to be more or less apparent that the automatic downshift of the drive ratio shift control valve 147, from its Fig. 6 position to its Fig. 5 position, is accomplished as a result of action just the reverse of that which occurs during automatic upshift. Considering first Fig. 6, which shows the valve 147 in its upshifted position, it will be noted that valve land 147a then covers "throttle" pressure inlet port 177 from conduit 144 so that "throttle" pressure cannot enter the valve chamber 145. Accordingly, the compressed spring 149 provides the only force acting on the right end of the valve 147 that tends to downshift the valve 147 towards the left. At this time the force of the "governor" pressure in the chamber 148 at the left end of valve 147 is opposing the force of the compressed spring 149 at the right end of valve 147 and these are the only axially directed forces acting on the valve 147. As the vehicle speed decreases the "governor" pressure will automatically decrease and eventually the force of the spring 149 will overcome the force of the "governor" pressure so that the valve 147 will begin to shift towards the right. After a predetermined rightward shift from the Fig. 6 upshifted position of valve 147, the valve land 147a will uncover the "throttle" pressure inlet port 177 from conduit 144. When the "throttle" pressure inlet port 177 is initially uncovered by leftward shift of valve 147, the "throttle" pressure from conduit 144 passes into the chamber 145 at the right end of valve unit 140 and through the valve bores 151 and 152 and out through the vent conduit 154 and thence through the restriction orifice 166 into the drain conduit 219a. Thus on uncovering of "throttle" pressure inlet port from conduit 144 the pressure of the fluid admitted to the aforementioned conduit path between the series arranged restriction orifices 143 and 166 is raised from zero to approximately one-half (½) the "throttle" pressure then existing in the conduit 125b on the downstream side of the restriction orifice 143. As a result of the uncovering of the "throttle" pressure inlet port by the initial rightward shift of valve 147, the force of the newly developed "differential" pressure trapped between orifices 143, 166, which is equal to one-half (½) of the "throttle" pressure intensity is suddenly added to the force of the compressed spring 149 and thus a suddenly increased force is applied to the right end of valve 147 to effect a snap action downshift of valve 147 towards the left end of valve bore 146. At the completion of the downshift of valve 147 the valve 147 is located in the bore 146 in the position shown in Fig. 5. At this time the valve land 147a is covering the escape port to conduit 154 so now the bleed of the "differential" pressure from chamber 145 through the restriction orifice 166 to drain 219a is terminated and full "throttle" pressure builds up in the chamber 145 at the right end of valve 147. After downshift of valve 147 to the Fig. 5 position, the force acting on the left end of valve 147 is again the force of full "throttle" pressure plus the force of the spring 149. The force of the "governor" pressure applied to valve chamber 148 at the left end of valve 147 must overcome both of the existing forces applied to the right end of valve 147 in order to initiate upshift of valve 147 to the Fig. 6 direct drive position. A very important feature of this automatic shift control valve 140 is the arrangement whereby false or unintended downshifts from the direct drive (Fig. 6) to the underdrive position (Fig. 5) are prevented when the throttle valve 120 is suddenly opened by an accelerator depression. It will be noted that when the valve 147 is upshifted (Fig. 6) that the "throttle" pressure inlet port 177 to valve 140 from conduit 144 is covered by valve land 147a so opening the "throttle" valve 120 does not automatically admit throttle pressure to bore 145 or increase the force applied to the right end of valve 147 that tends to downshift the valve 147 to the left to its Fig. 5 position. On the contrary only the force of the spring 149 at the right end of valve 147 opposes the force of the "governor" pressure applied to the left end of the valve 147 when valve 147 is in its upshifted position. When the vehicle speed has dropped sufficiently to permit spring 149 to shift valve 147 to the left enough to uncover "throttle" pressure inlet port 177, then the automatic downshift occurs. This feature of the valve 140 prevents unnecessary upshifts and downshifts of the transmission, eliminates engine racing and tends to improve transmission performance as well as increase transmission life.

It will be noted from a consideration of Fig. 6 that as the valve 147 is moved towards the left to initiate downshift that after a very slight rightward movement the "throttle" pressure inlet port is uncovered and that immediately the so-called "differential" pressure will develop in valve bore chamber 145. While a slight rightward movement of the valve 147 uncovers the "throttle" pressure inlet port 177 still this same rightward movement does not close off the "line" pressure supply port 150 for the clutch D or open the vent port 169 for the "line" pressure conduit 155. As a result of this design of the valve unit 140 the snap action "differential" pressure force can fully develop in bore chamber 145 before the direct drive clutch D is released and the underdrive brake band 57 applied and thus undesirable slipping of these friction elements is prevented.

It is thought to be quite clear that the shift of valve element 147 between its downshifted (Fig. 5) and upshifted (Fig. 6) positions controls the passage of "line" pressure fluid from the "line" pressure supply conduit 119 through the valve bore of shift valve unit 140 to the conduit 155 which connects to the "apply" bore 44 of the direct drive clutch D and the "off" chamber 58c of the forward underdrive control servo 58. Likewise, shift of valve 147 controls the venting of the "line" pressure fluid supplied to the conduit 155 for the movement of valve land 147d across the vent port 169 controls drain of the "line" pressure fluid from clutch D and servo chamber 58c back into the supply sump 26 through the vent port 169.

The aforementioned description of the operation of shift control valve 140 covers the normal automatic operation of the transmission control system when drive is initiated through the usual forward, starting Drive ratio. From an inspection of Figs. 9 and 10, as well as Fig. 5, it will be noted that in addition to the Drive position, which gives an automatic two-speed forward drive, another forward starting drive ratio, namely Low, is also provided and this Low ratio is also under the control of the shift control valve 140. Low ratio is utilized particularly for starting drive under extremely difficult circumstances. This Low ratio drive would be used when it might be desirable to rock the vehivle by quickly shifting between the Low and Reverse drive ratios. A consideration of Fig. 9 shows that the Low and Reverse positions of the ratio control lever 111 are in the same plane so such a shift as between Low and Reverse can be quickly and easily accomplished. Low ratio is also available for use as a coasting ratio when descending steep hills or the like. When the transmission control system is to be set for Low the shift lever 111 is manually moved to the Low position on the shift quadrant 250 and this shifts the drive ratio control valve 174 to the position shown in Fig. 7. As will be seen from the subsequent description, the shift control valve 147 will then be pressurized with "line" pressure in such a manner that it will be locked in the downshifted position shown in Fig. 5. In this, Low ratio, drive is always through the torque converter A and the compounded underdrive gear trains 50, 60 of the gear box B. The drive transmitting train in Low is the same as the normal starting drive train employed when starting in the Drive ratio. However, when starting in the Low ratio, provision is made in the control valving to prevent any automatic upshift of valve 147 to attain the direct drive ratio that would be achieved upon the engagement of the clutch D when the bands 57 and 67 are released.

From Fig. 7 it will be noted that when the drive ratio control valve 174 is placed in the Low position that "line" pressure from supply conduit 191 can pass through valve bore 171 of the ratio control valve 170 and out into both conduits 119 and 219. "Line" pressure fluid entering conduit 119 passes up to valve 140. However, "line" pressure from conduit 119 never passes through the valve 140 to the conduit 155 when the control 111 is set for Low ratio, for shift valve 147 will be locked in the downshifted position (shown in Fig. 5) so that the valve land 147c will cover "line" pressure supply port 150. The means for locking the shift valve 147 in the downshifted position is described hereafter. When set for Low, "line" pressure from conduit 119 also passes into the branch conduits 119a and 119b from whence it is directed into conduit 160 which applies the "line" pressure to the "line" pressure "on" chamber 58b of the servo 58. "Line" pressure in servo chamber 58b effects application of the brake band 57 to activate the compounded planetaries 50, 60 for the forward underdrive ratio ratio that is the same ratio as the breakaway starting ratio when the transmission is set in Drive. When set for Low, "line" pressure passes through the valve bore 171 of the drive ratio control valve 170 and out into the conduit 219 from whence it is passed into branch conduit 219a and then into the right end of valve bore chamber 148 of the shift control valve 140. "Line" pressure in the right end of bore chamber 148 of valve 140 acts on the inner side of valve land 147b of shift valve 147 and opposes the "governor" pressure applied to the outerside of valve land 147b. In addition, the "line" pressure in branch conduit 219b also forces the ball valve 260 upwardly and unseats it so that "line" pressure can pass through the unseated valve 260 into conduit 144 and up into the chamber 145 at the left end of valve 147. From the above description it is seen that the force of the "line" pressure in valve bore chambers 145 and 148 cooperates with the force of the spring 149 to oppose the force of the "governor" pressure applied to the left end of valve 147. As the "line" pressure is always equal to or greater than the "governor" pressure, the valve 147 will be held or locked in its downshifted position whenever the drive ratio control valve 170 is set for Low ratio and thus Low will continuously provide an underdrive ratio regardless of car speed or the degree of throttle valve opening.

The Low ratio is obtained by a manual shift of the Drive ratio control valve 174 to the Low position as described above. As the shift control valve 147 is locked in downshifted position when Low ratio is being used, it is never possible to automatically upshift from Low to the forward Drive ratio. The Drive ratio for automatic operation is obtainable by manually placing the drive ratio selector lever 111 in the Drive position. However, after starting drive by a setting of the shift lever 111 in Low, it is possible to subsequently shift the drive ratio selector lever 111 to the Drive position at any time and the forward drive will be continued in a smooth, uninterrupted fashion in the Drive ratio. After the shift from Low to Drive, the drive train that carries on may be either the forward underdrive ratio or the direct drive ratio depending on the vehicle speed and the amount of throttle valve opening at the time the shift is made from the Low ratio to the Drive ratio.

It is also possible to manually downshift from the Drive ratio to the Low ratio in order to secure coast braking in the Low underdrive ratio. Downshifts to Low from Drive are quite advantageous when operating in either hilly or mountainous country as they provide a means for reducing the amount of driver braking required and in addition such a shift assists in keeping the vehicle under the full control of the operator. This downshift from Drive to Low may be accomplished at any vehicle speed under substantially 65 miles per hour.

Fig. 8 shows the condition of the elements of valve units 120 and 140 immediately after the accelerator pedal 115 has been depressed to substantially its limit of throttle opening movement to effect a kickdown from direct drive (Fig. 6) to low or breakaway drive (Fig. 5). In many instances while traveling along in the cruising direct drive of the Drive ratio (Fig. 6) it may be necessary or advantageous to effect an immediate downshift to the underdrive ratio (Figs. 5 and 8) in order to get a more favorable accelerating ratio. This shift may be readily accomplished by merely depressing the accelerator 115 to a point approaching the wide open position of the carburetor throttle or at least depressing the accelerator to a position corresponding to within the last five (5) or ten (10) degrees of wide open position of the engine throttle control. On depressing the accelerator 115 to the aforementioned limiting range, the linkage 117 (see Fig. 11) will rotate cam 217 counterclockwise and cause the finger 217b of cam 217 to engage plunger rod 231 of the kickdown valve 230 and move rod 231 towards the right (see Fig. 8). Movement of plunger rod 231 to the right will cause it to unseat the ball-type valve 232 of kickdown valve assembly 230 and permit "throttle" pressure fluid of maximum intensity (approx. 90 p.s.i.) in chamber 233 of valve 230 to enter the conduit 219c and then pass through the restriction orifice 163 into the conduit 154 (see Fig. 6) that connects with the port 153 of the valve bore. "Throttle" pressure passing through port 153 into the valve bore of valve unit 140 (see Fig. 6) enters the bores 152 and 151 respectively of the shift control valve 147 and is passed therethrough into the chamber 145 at the right end of valve 147. Thus with a sudden full depression of the accelerator 115, the force developed by the compensated "throttle" pressure fed through opened kickdown valve 232 is applied to the right end of valve element 147 to assist the spring 149 in downshifting the valve 147 toward the left. The pressure fluid fed through opened kickdown valve 232 and supplied to the chamber 145 at the right end of the valve 147 of shift valve unit 140 is a compensated "throttle" pressure the pressure of which is dependent on the sizes of the series arranged restriction orifices 163 and 166. It will be noted that when kickdown valve 232 is unseated by the plunger rod 231 that the "throttle" pressure fed through restriction orifice 163 not only passes into the chamber 145 of the valve bore 146 but in addition it passes through the restriction orifice 166 and out through the drain conduit 219a to sump 26. Here again is a pair of restriction orifices arranged in series and the resulting pressure of the compensated "throttle" pressure fluid trapped between the orifices 163 and 166 can be calculated in the same manner as previously set forth relative to the calculation of the pressure of the differential "throttle" pressure fluid trapped between the restriction orifices 143 and 166 during normal upshifts and downshifts when operating in the Drive ratio. As a kickdown is accomplished by substantially a full depression of the throttle valve accelerator 115, it is obvious that the "throttle" pressure fed to the kickdown valve chamber 233 at this time will be at its maximum value and substantially equal to the "line" pressure which is normally about 90 p.s.i. The differential or compensated "throttle" pressure fluid fed into the valve bore chamber 145 of valve unit 140 during a kickdown will normally be somewhere between one-half and full "throttle" pressure depending on the relative sizes of the orifices 163 and 166. It is thought to be obvious that the intensity of the differential pressure applied to valve bore chamber 145 during a kickdown can be readily varied by varying the sizes of the orifices 163 and 166. Furthermore, by a consideration of the valving 140 and its method of functioning, it is thought to be apparent that the ratio of the sizes of the orifices 163 and 166 will control the upper limit or maximum vehicle speed at which a kickdown may be secured. As the sizes of the orifices 163, 166 control the pressure of the differential fluid supplied to chamber 145 during a kickdown, they thus control the force applied to the right end of the valve 147 and this force must be such that when it is combined with the force of the spring 149 it will overcome the force of the "governor" pressure applied to the left end of valve 147 in order to effect a kickdown of the valve 147. With the orifice sizes that have been used in transmissions embodying this type of control system, kickdowns can be secured up to approximately 55 miles per hour when the transmission is operating in the Drive ratio. It will be noted from a consideration of Fig. 8 that the kickdown valve unit 230 is designed such that it tends to prevent an accidental kickdown during normal accelerator depression. As the accelerator 115 is depressed it normally acts against the force of its return spring 115a (see Fig. 5) and against the force exerted by the "throttle" pressure fluid in the chamber 123a at the right end of valve 120. However, after the accelerator 115 has been almost fully depressed the finger 217b of throttle cam 217 engages rod 231 and moves it against the kickdown valve 232. Valve 232 is held on its seat by the spring 234 and by the force exerted by the "throttle" pressure fluid in the chamber 233 of kickdown valve 230. Thus to accomplish the kickdown a sufficient additional force must be applied to the accelerator 115 to overcome the force of the "throttle" pressure in the chamber 233 and the spring 234 in addition to that required to normally depress the accelerator. This arrangement of the valve element 232 provides a dual function for the kickdown valve 230 that is quite advantageous from an operational standpoint. Fig. 8 shows the underdrive servo 58 in sectional elevation whereas Figs. 5-7 show the underdrive servo in diagrammatic form only.

Reverse drive (see Fig. 5) is obtained by manually shifting the drive ratio selector valve 174 to the right so as to connect "line" pressure supply conduit 191 with the reverse drive pressure fluid supply conduit 225. Pressurizing conduit 225 activates servo 68 and applies the reverse drive brake band 67. Reverse servo 68 is described in detail in William L. Sheppard application Serial No. 211,300, filed February 16, 1951, now U.S. Patent 2,633,712. It will be noted that neither of the conduits 119 nor 219 receive "line" pressure when the drive ratio selector valve 174 is in Reverse drive position so the other control valving 120, 130, 140, 230, associated with conduits 119 and 219, are also inactive when Reverse drive is being transmitted. It will be found that the "line" pressure regulator valve 185 of this transmission control system provides a "line" pressure of about 250 p.s.i. or almost three times the forward drive "line" pressure (90 p.s.i.) when the transmission is set for Reverse drive. William L. Sheppard co-pending application Serial No. 98,493, filed June 11, 1949, now U.S. Patent 2,697,363, previously referred to, contains a complete description of the line pressure regulator control valve 185. Valve 185 forms no part of this invention. Admission of "line" pressure to the chamber 68a of the Reverse drive servo 68 not only applies the reverse drive brake band 67, but in addition, it closes the pressure operated reverse or back-up light switch 238 so that the lights 239 will be lit while the transmission is conditioned for Reverse drive.

From a consideration of Fig. 9 it will be noted that the shift pattern for the drive ratio selector lever 111 is a two plane arrangement wherein the lever 111 is raised above its normal plane to position it in either Reverse or Low. Also Reverse and Low are in the same raised plane so the lever 111 can be easily and quickly swung between Low and Reverse to effect rocking of the vehicle to drive out of a rut or the like. It will also be noted that to move the drive ratio selector lever 111 from Neutral to either of the forward drive ratios Drive or Low, does not require passage of the lever 111 through the Reverse drive position. Likewise, Reverse drive can be obtained without passing the drive ratio lever 111 through either of the forward drive ratio positions. Such an arrangement prevents accidents that might otherwise occur due to sluggish operation of the transmission controls in cold weather. Fig. 10 is a fragmentary plan elevation of the shift lever control quadrant 250 that corresponds to the Fig. 9 design.

Fig. 11 is a fragmentary side elevation of a vehicle power plant embodying this invention and corresponding to Figs. 1-5. The engine E has a downdraft type carburetor 270 that includes a revolvable engine control throttle valve 271. Carburetor throttle valve 271 is connected to the linkage 117 that is operated by the accelerator pedal 115. Linkage 117 is also connected to the linkage 116 that operates the throttle valve 120 of the transmission control valving. Each of the control valve units 120, 130, 140, 170, 185, 230 are formed as integral parts of a valve body 300. The valve body 300 is detachably mounted on the underside of the transmission gear box casing 42 as shown in Fig. 11. This arrangement permits the drain ports or vents of the several control valves to spill directly into the transmission oil sump 26 so that the control system fluid may be readily recirculated by the pumps 25 and 84. Valve body 300 has the drive ratio control valve 170 thereof connected through linkage 113 to the shift lever 111 so that the various driving ratios may be manually selected by the vehicle operator. The several valves of the control system for this power transmission unit are contained within the valve body 300 (see Figs. 16, 17, 18 and 19) that is detachably mounted by means of its support plate 301 in the sump area 26 beneath the gearing of the gear box B. As valve body 300 is enclosed by gear box housing 42, it is obvious that oil vented from the several vents V of the valve body 300 will be discharged into the sump 26 such that it may be recirculated by the pumps 25 and 84 after the oil has passed through the strainer 299 (see Fig. 5).

Valve body 300 (see Figs 16-19) includes a removable cover or end plate 305 that has recesses therein to provide the bore chambers 145, 131 and 233 for the shift control valve 140, the shuttle valve 130 and the kickdown valve 230 respectively. The arrangement of the several valves within the valve body 300 is thought to be quite obvious from an inspection of Figs. 16-19 and a consideration of Figs. 5-8. Operation of the several valves by the vehicle driver is accomplished through actuation of a pair of relatively rotatable shafts 306 and 307 that are concentrically arranged within the valve body 300. From an inspection of Fig. 11 it will be noted that suitable linkage is connected to each of these rotatable shafts 306 and 307 such that movement of the drive ratio control lever 111 and the accelerator 115 will respectively operate linkage 113 and 116. Movement of the drive ratio control lever 111 causes linkages 113 to rotate the shaft 306 and turn the attached lever plate 308 in an arc about shaft 306. Lever plate 308 has a finger 309 that is engaged with the drive ratio control valve element 174 so that movement of lever 111 will control the position of valve 174 within its bore in the valve body 300. A spring detent mechanism 310 is provided to lock the lever plate 308 in each of its selected positions.

The accelerator pedal 115 is connected by the linkage 117, 117c to (Fig. 12) the engine carburetor throttle valve 271 and by the linkage 117d to the shaft 307 of valve body 300 such that depression of accelerator 115 will cause rotation of the shaft 307 clockwise. Cam plate 217 is drivingly connected to the shaft 307 and thus it is thought to be obvious that depression of accelerator 115 will cause the cam surface on edge 217a of plate 217 to actuate the pivoted lever linkage 116 and operate the throttle responsive valve element 121 of the throttle valve 120. As cam plate 217 carries the finger element 217b, it is thought to be obvious that a more or less full depression of the accelerator 115 will move the finger 217b of plate 217 into engagement with the kickdown valve push rod 231 such that push rod 231 will unseat kickdown control valve 232 and apply a compensated "throttle" pressure to chamber 145 of valve 140 so as to effect the kickdown downshift to the left (see Fig. 8) of the valve 147.

Part of the invention that it is desired to specifically cover in this application relates particularly to the servo restrictor valve 240, the throttle pressure control cam 217 and the forward underdrive servo 58. Considering first the servo restrictor valve 240 (see Figs. 13 and 14), it will be noted that this valve consists of a valve body 241 having a bore 242 therein that is connected to the "line" pressure supply conduit 119b. Conduit 119b is intended to supply, by way of conduit 160, a substantially constant pressure "line" pressure fluid to the "line" pressure "apply" chamber 58b of the servo 58 to cause application of the underdrive brake band 57. By means of the servo restrictor 240 the "line" pressure from conduit 119b is applied to the servo "apply" chamber 58b at two different rates so as to give either a relatively fast or a relatively slow application of the underdrive brake band 57.

Connected to the valve bore 242 of servo restrictor valve 240 is an outlet port 243 that is connected to the servo "line" pressure supply conduit 160. Outlet port 243 is arranged to be connected to and disconnected from the valve bore 242 by the reed-type plate valve 244. Reed valve 244 has one end thereof anchored to the valve body 241 by a pin 245 and the other end of reed valve 245 is free and arranged to be flexed or actuated to open position (Fig. 13) by the plunger-type piston 246. Plunger-type piston 246 is reciprocably mounted in a valve bore 247 that is connected to the "throttle" pressure supply conduit 125b. It will be noted that the reed valve 244 has an aperture 248 therein that is aligned with the valve body outlet port 243. When reed valve 244 is seated on port 243 (see Fig. 7) then "line" pressure fluid from conduit 119b can slowly bleed through the aperture 248 into the conduit 160 and cause a relatively slow or gradual application of the underdrive brake band 57. Reed valve 244 is seated on its outlet port seat 243 whenever the "throttle" pressure in the conduit 125b is at or below the value corresponding to engine idle or so-called "closed throttle" condition. Accordingly, whenever the engine throttle is at idle position, as during coast drive, then the reed valve 244 is closed or seated and the "line" pressure from conduit 119b must feed the servo 58 through the restriction aperture 248 in valve 244 and this causes a slow or gradual application of the underdrive brake band 57. When, however, the engine accelerator 115 is depressed to cause the engine throttle valve 271 to open, then the transmission control throttle cam 217 is rotated to cause a shift of the "throttle" pressure valve 121 to an opened position. Opening the "throttle" pressure valve 121 will pressurize the "throttle" pressure conduit 125b with a relatively high "throttle" pressure and this will cause the plunger piston 246 of the servo restrictor valve unit 240 to be depressed to a position similar to that shown in Fig. 13. Depression of plunger 246 by an increased "throttle" pressure unseats the reed valve 244 and permits unrestricted flow of the "line" pressure fluid from the supply conduit 119b through the restrictor valve 240 to the conduit 160 and to the "line" pressure "apply" chamber 58b of the servo 58. Thus it is apparent that the servo restrictor valve 240 is a fluid flow control valve for the "line" pressure supplied servo 58 and this flow control valve is responsive to accelerator operation. The advantages of the engine throttle controlled restrictor valve are thought to be obvious from the above description for it is readily apparent that during kickdowns from direct to underdrive the restrictor valve 244 will be unseated and the "line" pressure will quickly apply the brand band 57 so as to prevent band and clutch slippage and/or engine runaway. However, on a coast downshift when a harsh band engagement would be particularly noticeable, then the restrictor valve reed 244 is seated and the "line" pressure in conduit 125b must flow through the restriction 248 in valve 240 to reach the apply chamber 58b of servo 58. This insures a very gradual application of the brake band 57 at a time when engine runaway is no problem, due to the throttle valve 271 being closed, and thus improved downshifts are achieved as a result of the servo restrictor valve 240 and its novel arrangement in the control system.

In addition to the servo restrictor valve 240, this transmission control system includes an improved form of "throttle" pressure control cam 217 for the "throttle" pressure control valve 121. Figs. 12 and 15 are thought to best show the novel features of the "throttle" pressure control cam 217. Before describing the cam 217, it will be helpful to point out the problem that existed prior to the design of the cam 217, and then it will be readily apparent why and how the cam 217 has overcome the disadvantages of "throttle" pressure cams of prior design. From the preceding description it is thought to be obvious that it is advantageous to have a reduced or minimum "throttle" pressure in the transmission control system when the accelerator pedal has been released to its engine "idle" or "closed throttle" position. Thus one of the requirements for the cam 217 is that it provide means for insuring a reduced "throttle" pressure at "closed throttle" position of the accelerator and further that it provide a positive means for immediately raising the "throttle" pressure a significant amount once the accelerator 115 is depressed. Cam 217 is formed with its cam edge 217a adapted to be slidingly engaged with the roller follower 116a that is carried by the pivotally mounted "throttle" pressure control lever 116. Near one end of the cam plate track portion 217a there is formed a noticeable bump or point 217c. This bump or point 217c is so located on the cam edge or follower track portion 217a that when the roller 116a has passed over the bump 217c in a counterclockwise direction (see Figs. 12 and 15) it will be firmly cradled in a slight depressed portion of cam edge 217a between the bump 217c and the stop member 217d. This is the position when the accelerator 115 is in its released or engine "idle" position. As a result of this cam arrangement when the accelerator 115 is depressed from its "closed throttle" or engine "idle" position then the follower 116a is moved counterclockwise and immediately the bump 217c acts upon the follower 116a and causes it to open the "throttle" pressure valve 121 a predetermined amount to provide a significantly increased "throttle" pressure for application to the several valves of the transmission control system such as the valves 130, 140, 230, 240 and the "throttle" pressure apply chamber 58a of the servo 58.

Not only is the cam bump portion 217c an important element of the cam 217 but in addition the use of and the location of the positive follower stop 217d is a very important element of the "throttle" pressure cam 217 and forms a part of this invention. This stop 217d is of particular advantage in that it will automatically locate the follower 116a with respect to the cam bump 217c so that the "throttle" pressure at engine "idle" will be at a predetermined relatively low value. However, the cam 217 and follower 116a are so arranged that a significant rise in "throttle" pressure will be achieved immediately upon depression of the accelerator 115 from its engine "idle" or "closed throttle" position. Prior to the incorporation of the follower stop element 217d in the cam 217 it was difficult to set the engine "idle" or closed throttle position of the follower 116a to insure the attainment of the necessary relationship between the follower 116a, the bump 217c and the engine "idle" position of the "throttle" pressure cam 217. If the follower 116a did not pass over the bump 217c to a position of reduced "throttle" pressure, when the accelerator 115 was released, then the reed valve 244 of servo restrictor valve 240 would not fully close or seat and coast drive downshifts would be harsh. On the other hand, if the follower 116a should pass considerably beyond the bump 217c, in moving counterclockwise (see Figs. 12 and 15), and should not be seated in a position to the left and immediately adjacent the bump 217c on accelerator release, then on accelerator depression there would be an engine flare up or runaway before the "throttle" pressure supplied to the chamber 58a of servo 58 would be sufficiently high to firmly anchor the brake band 57. The arrangement of the stop 217d so that the follower 116a will be anchored in engine "idle" position to the left of and immediately adjacent the bump 217c is a prime feature of this invention.

To point out the ease with which a transmission may be initially adjusted when the cam 217 is constructed in accordance with this invention, Fig. 12 should be considered. This figure of the drawings shows the engine carburetor throttle valve 271 connected to a two-piece link 117c that includes an adjustable connection 117e to facilitate variation in the effective length of the link 117c. The end of the link 117c that is not connected to the carburetor throttle valve 271 is connected to one end of a centrally pivoted lever 117g. The other end of pivoted lever 117g is connected to the rotatable "throttle" pressure cam 217 by the link 117d. Pivoted lever 117g is adapted to be rotated about its centrally located pivot center by means of the link 117k that is connected between lever 117g and the accelerator pedal 115. When the transmission control linkage 117 for the "throttle" pressure cam 217 is to be set for transmission operation, it is merely necessary to release the adjustable connection 117e of the two-piece link 117c and to separate the two parts of the link 117c until the engine carburetor throttle valve 271 has been moved against its closed throttle stop as shown in Fig. 12. This establishes the closed throttle position of the carburetor throttle valve 271 and at the same time the "throttle" pressure cam 217 will be rotated clockwise to a position where the follower stop 217d is positioned against the roller follower 116a with the follower 116a cradled between the stop 217d and the "throttle" pressure increasing bump 217c. It is thus seen that the predetermined optimum "closed throttle" positions of the follower 116a, the cam 217 and the carburetor throttle valve 271 are automatically achieved as a result of the novel structure herein disclosed. This novel "throttle" pressure control linkage cooperates with the servo restrictor valve 240 and the underdrive servo 58 to produce improved transmission performance and extended transmission life in addition to the elimination of a considerable amount of trial and error type of adjustment in setting the "throttle" pressure control linkage.

In addition to the aforementioned novel structure associated with the throttle pressure cam 217, the servo restrictor valve 240 and the underdrive servo 58, there is disclosed herewith a pair of restriction orifices 389 and 390 respectively that also cooperate with the servo 58, the direct drive clutch D and the shift valve 140 to improve the speed ratio changes in this type of transmission control system. These restriction orifices 389 and 390 are each in the "line" pressure supply conduits 119 and 155 respectively with the restriction 389 located on the upstream or intake side of shift valve 140 and the restriction 390 located on the downstream or discharge side of shift valve 140. In the particular installation herein disclosed the restriction 389 is considerably smaller than the restriction 390.

The prime function of the restriction 389 will be described first and after that the restriction 390 will be discussed. It will be noted from a comparison of Figs. 5 and 6 that the restriction 389 will act as a flow control device to slow down the flow of "line" pressure from supply conduit 119 through the shift valve 140 to the conduit 155 when the shift valve element 147 is upshifted from its Fig. 5 to its Fig. 6 position. Restriction 389 thus slows down the feed of "line" pressure to the "apply" chamber 44 of the direct drive clutch D and to the "off" chamber 58c of the underdrive servo 58. By slowing down the "line" pressure feed to the conduit 155, after the upshift of the shift valve 147, the "line" pressure supplied to the servo "off" chamber 58c does not cause a quick disengagement of the underdrive brake band 57 before the direct drive clutch D begins to engage and in this manner engine runaway and clutch slipping and burning are eliminated. The restriction 389 provides for the development or build up of a "balance" pressure in the connected conduits 155, 155b and 155c such that the clutch D is substantially "feathered" into engagement as the underdrive brake band 57 is released and thus smooth upshifts result. The "balance" pressure in conduits 155, 155b, 155c during an upshift is applied to a greater area on the "off" side of the underdrive servo piston 59 than the pressure fluids simultaneously applied to the areas on the "apply" side of the servo piston 59. The servo piston "apply" areas are acted on by the "throttle" pressure in chamber 58a and the "line" pressure in chamber 58b. Accordingly, if the "line" pressure fed to the "off" chamber 58c of the servo 58 during an upshift was not slowed down by the restriction 389 to provide for the development of a "balance" pressure, the underdrive brake band 57 would be quickly disengaged before the direct drive clutch D could be engaged and smooth upshifts could not be obtained. The "balance" pressure for cushioning upshifts, that is developed in the connected branch conduits 155b, 155c during an upshift operation, is a direct result of the utilization of the restriction 389 in the "line" pressure supply conduit and this represents another of the novel features of this invention. It will be found that this "balance" pressure is a function of the throttle valve opening or "throttle" pressure corresponding to the various engine torques. This variable "balance" pressure thus produces direct drive clutch engagements that are tailored to the existing torque load and smooth upshifts are thereby achieved under all conditions.

The restriction 390 located in the conduit 155b, on the upstream side of the junction 155j from which diverge the branch conduits to the direct drive clutch D and the low servo 58, is primarily intended to insure smooth kickdowns from direct drive to the forward underdrive and to prevent engine "flare-up" or "runaway" during such kickdown shifts in the forward speed ratio drives. It will be noted from Figs. 6 and 8 that on a kickdown or a downshift from direct drive, the shift valve 147 of valve unit 140 is shifted to the left to close off the "line" pressure supply from conduit 119 and to open up a drain port from the conduit 155 through the vent V in valve unit 140. This leftward shift of valve 147 effects release of the pressurized fluid in the "apply" chamber 44 of direct drive clutch D and in the "off" chamber 58c of the underdrive servo 58 so that the clutch D will be disengaged at the same time that the underdrive brake band 57 is applied. On kickdowns, particularly at slow speeds, it will be found that venting the "line" pressure fluid feed conduit 155 through the shift valve 140, in the absence of the restriction orifice 390, will disengage the direct drive clutch D and drain the "off" chamber 58c of underdrive servo 58 at such a fast rate that a downshift bump, that is a harsh downshift, occurs. By incorporating a flow restriction means 390 in the conduit 155b it is possible to slow down the rate of direct drive clutch disengagement and underdrive band engagement so that the downshift or kickdown to underdrive is a smooth transition rather than a harsh bump caused by the sudden grabbing of the drum 43 by the brake band 57. This restriction orifice 390 works at times in combination with the shuttle valve 130 however the shuttle valve 130 is covered by a separate pending application filed in the name of William L. Sheppard under date of November 2, 1951, Serial No. 254,531, now U.S. Patent 2,740,304, and discussion of the shuttle valve operation is not considered to be necessary in this application.

I claim:

1. In a pressure fluid operated control system for a transmission unit drivingly connected to a throttle valve controlled engine, a pressure fluid operated servo mechanism influenced by the operation of a shift control valve subject to control means responsive to vehicle speed, a first source of substantially constant intensity pressure fluid connected to said servo mechanism by a first conduit means to in part effect operation of said servo mechanism, a second source of pressure fluid responsive to the degree of opening movement of said engine throttle valve connected to said servo mechanism by a second conduit means to in part effect operation of said servo mechanism, a fluid flow control valve to effect relatively slow coast drive downshifts and relatively fast kickdowns from a high speed to a low speed drive, said flow control valve being independent of said vehicle speed responsive control means and being connected to said first conduit means and operable to provide for the application of said constant intensity pressure fluid to said servo means at a plurality of different rates, and pressure fluid operated means operable by and responsive to the pressure of said second source of pressure fluid to operate said flow control valve to cause said flow control valve to increase the rate of fluid flow from said first source to said servo in direct proportion to the pressure of the fluid from said second source.

2. In a pressure fluid operated control system for a transmission unit drivingly connected to a throttle valve controlled engine, a pressure fluid operated servo mechanism influenced by the operation of a shift control valve subject to control means responsive to vehicle speed, a first source of substantially constant intensity pressure fluid connected to said servo mechanism by a first conduit means to in part effect operation of said servo mechanism, a second source of pressure fluid responsive to the movement of said engine throttle valve connected to said servo mechanism by a second conduit means to in part effect operation of said servo mechanism, a fluid flow control valve to effect relatively slow coast drive downshifts and relatively fast kickdowns from a high speed to a low speed drive, said flow control valve being independent of said vehicle speed responsive control means and being connected to said first conduit means and operable to provide for the application of said constant intensity pressure fluid to said servo means at a plurality of different rates that are directly proportional to pressure of the fluid from the second source, pressure fluid operated means operable by and responsive to the pressure of said second source of pressure fluid to operate said flow control valve, and control means for said pressure fluid operated means comprising a cam element operable by movement of said engine throttle control valve and a follower element engaged with said cam element and operable to vary the pressure of said second source of fluid pressure, said cam having a cradle portion to seat said follower at engine idle position including cam portions to effect reduction of said second source of pressure fluid to a predetermined minimum intensity when said engine throttle valve is in engine idle and coast drive position and other adjacent cam portions to instantaneously effect a material increase in the pressure of said second source of pressure fluid when said engine throttle valve is initially moved from engine idle position towards wide open throttle and kickdown position.

3. In a pressure fluid operated control system for a transmission unit drivingly connected to a throttle valve controlled engine, a speed ratio control means operable by pressure fluid responsive to the degree of opening of the throttle valve, linkage means connecting the engine throttle valve to a throttle valve operator, said linkage means including means to vary the effective length thereof, a rotatable cam and a follower engageable therewith, said follower being operably connected to a pressure regulating valve to effect operation thereof and provide a pressure fluid responsive to the degree of opening of the throttle valve, said cam being operably connected to the throttle valve operator for actuation thereby, said cam including first angularly related cam profile portions engageable with said follower and providing a cradle therefor to establish a definite seat for closed throttle position of said cam with respect to said follower and second portions on said cam adjacent said seat adapted to cause a significant opening of said pressure regulating valve when said follower initially moves from its closed throttle position towards an open throttle position, and additional means carried by said cam and operable on movement of said cam to a substantially wide open throttle valve position to effect activation of another pressure control valve.

References Cited in the file of this patent

UNITED STATES PATENTS

| | | |
|---|---|---|
| 1,979,488 | Perez | Nov. 6, 1934 |
| 2,330,388 | Scott-Paine | Sept. 28, 1943 |
| 2,372,817 | Dodge | Apr. 3, 1945 |
| 2,376,545 | Livermore | May 25, 1945 |
| 2,595,969 | McFarland | May 6, 1952 |
| 2,645,135 | Frank | July 14, 1953 |
| 2,658,412 | Kelbel | Nov. 10, 1953 |
| 2,663,393 | Livermore | Dec. 22, 1953 |
| 2,740,304 | Sheppard | Apr. 3, 1956 |

UNITED STATES PATENT OFFICE
CERTIFICATE OF CORRECTION

Patent No. 2,932,977                        April 19, 1960

Jeremy T. Ball

It is hereby certified that error appears in the printed specification of the above numbered patent requiring correction and that the said Letters Patent should read as corrected below.

Column 5, lines 57 and 58, for "eccelerating" read -- accelerating --; column 6, line 31, for "aumatically" read -- automatically --; column 8, line 51, for "governer" read -- governor --; line 56, for "tto" read -- to --; same column 8, line 66, after "left" insert -- end --; column 9, line 38, strike out "chamber""; column 10, line 29, for "vale" read -- valve --; line 40, for '"thottle"' read -- "throttle" --; same column 10, line 64, for "springs" read -- spring --; column 14, line 23, for "vehivle" read -- vehicle --; line 66, strike out "ratio", second occurrence; column 18, line 24, for "linkage" read -- linkages --; line 25, for "linkages" read -- linkage --; column 19, line 44, for "brand" read -- brake --.

Signed and sealed this 25th day of October 1960.

(SEAL)
Attest:

KARL H. AXLINE                        ROBERT C. WATSON
Attesting Officer                  Commissioner of Patents